Figure 10:
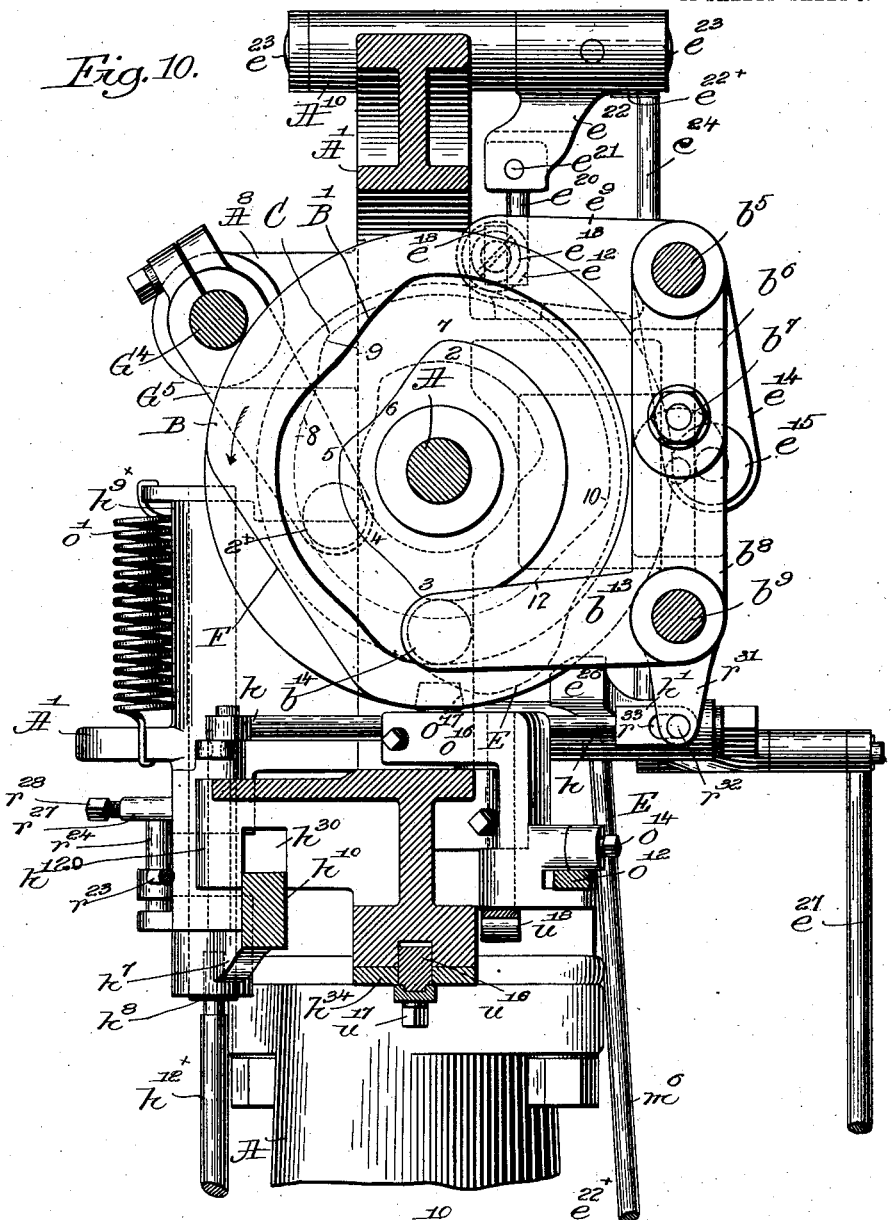

O. ASHTON.
PEGGING MACHINE.
APPLICATION FILED MAY 29, 1901.
1,021,815.  
Patented Apr. 2, 1912.  
12 SHEETS—SHEET 1.
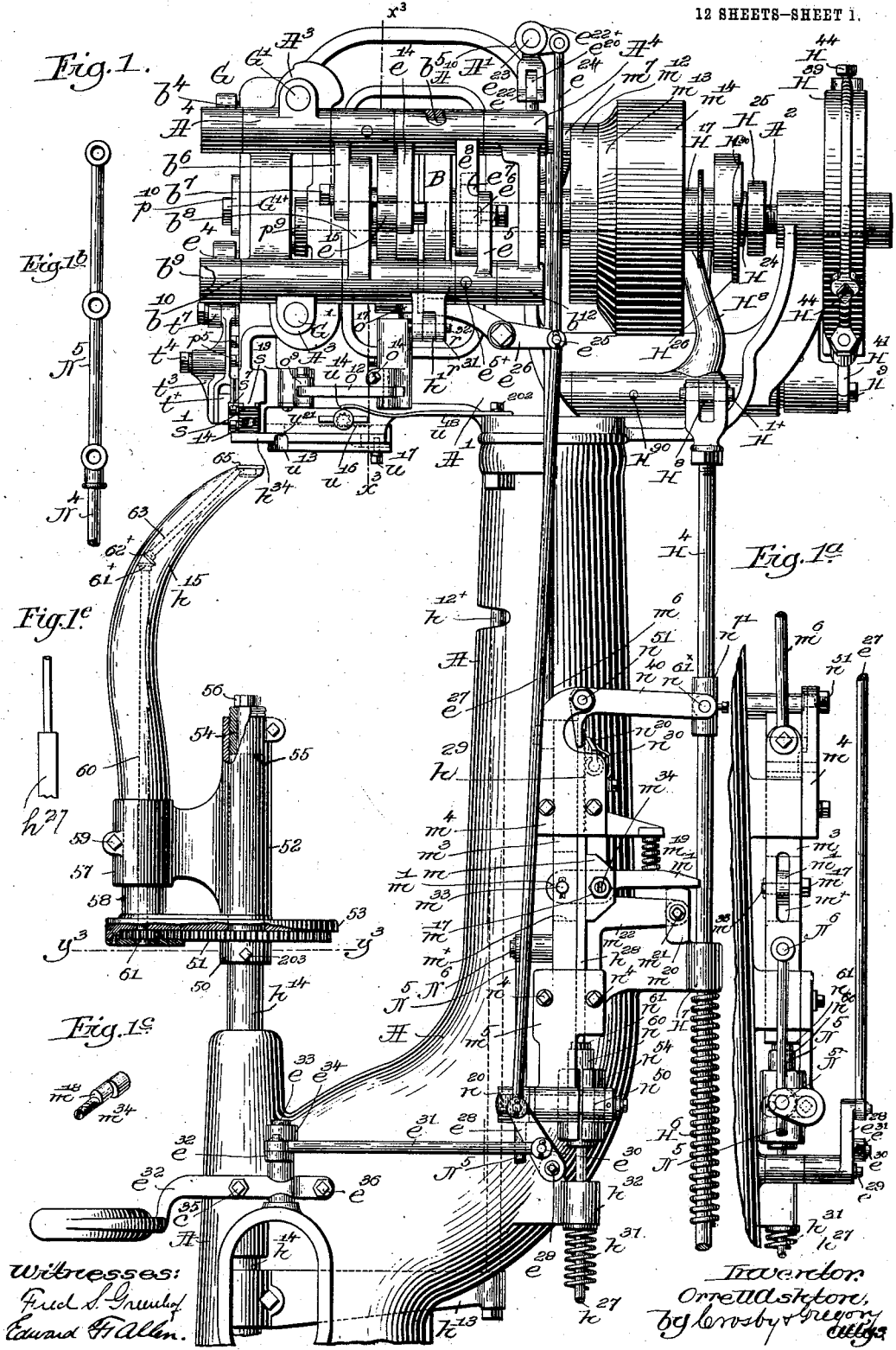

O. ASHTON.
PEGGING MACHINE.
APPLICATION FILED MAY 29, 1901.
1,021,815.
Patented Apr. 2, 1912.
12 SHEETS—SHEET 2.
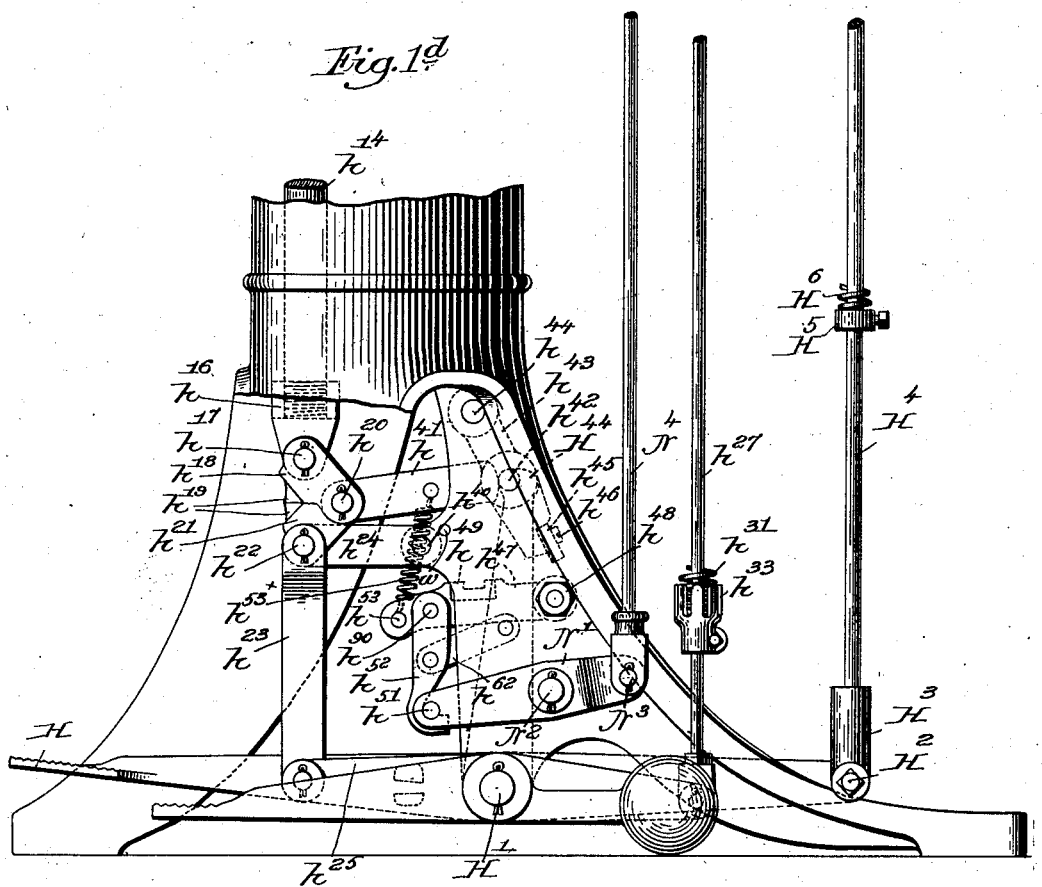
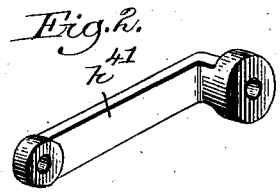

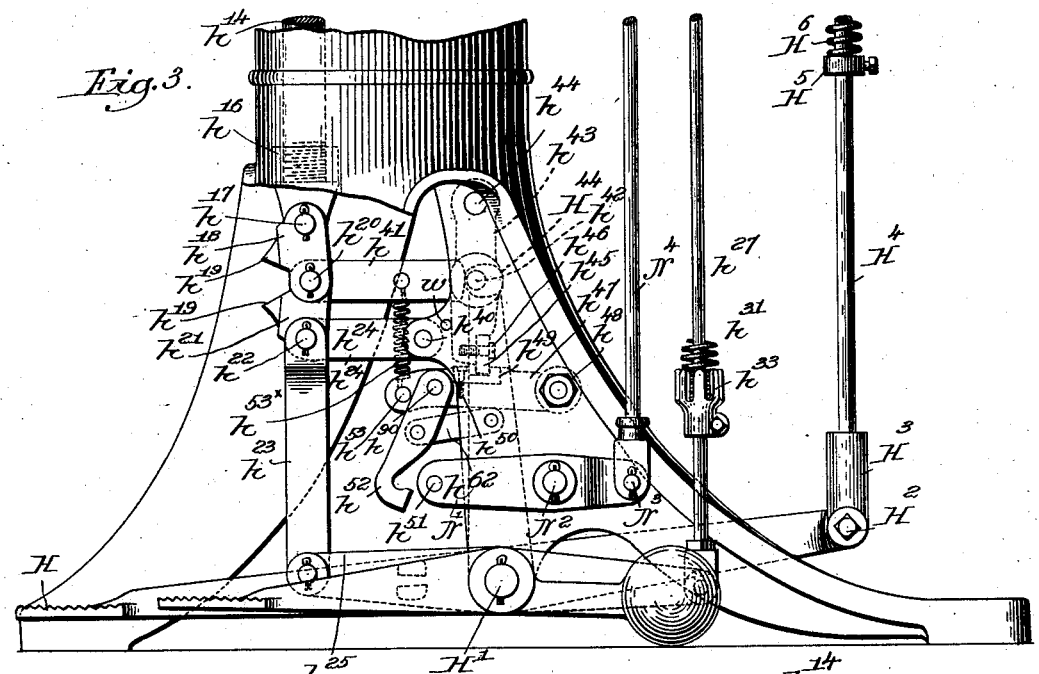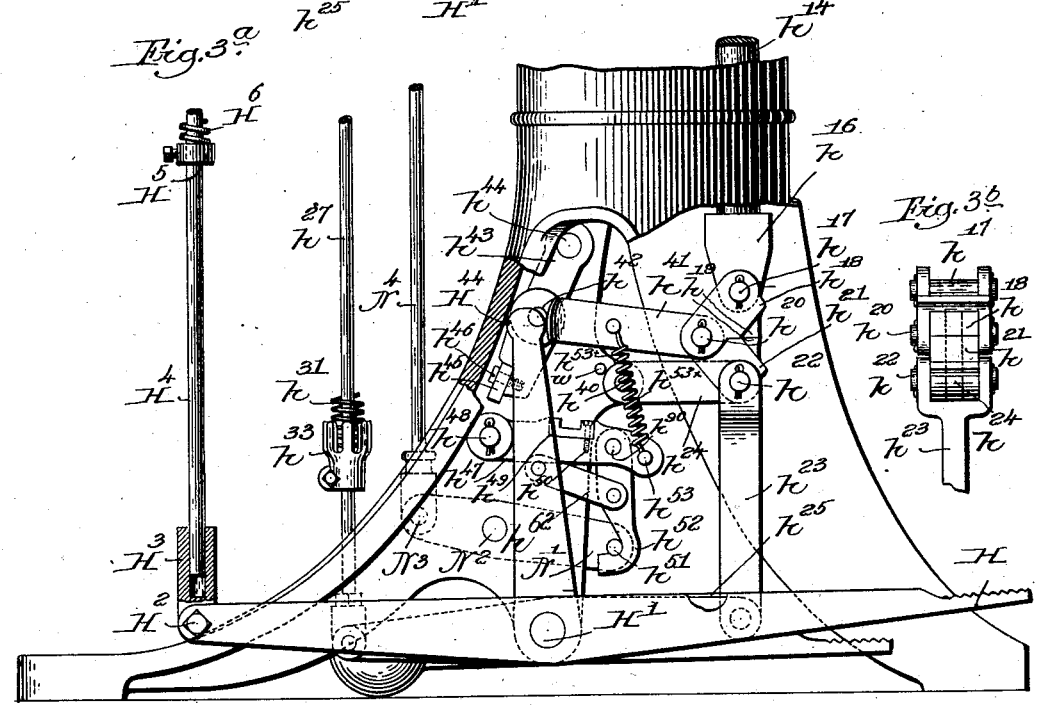

O. ASHTON.
PEGGING MACHINE.
APPLICATION FILED MAY 29, 1901.
1,021,815.
Patented Apr. 2, 1912.
12 SHEETS—SHEET 4.
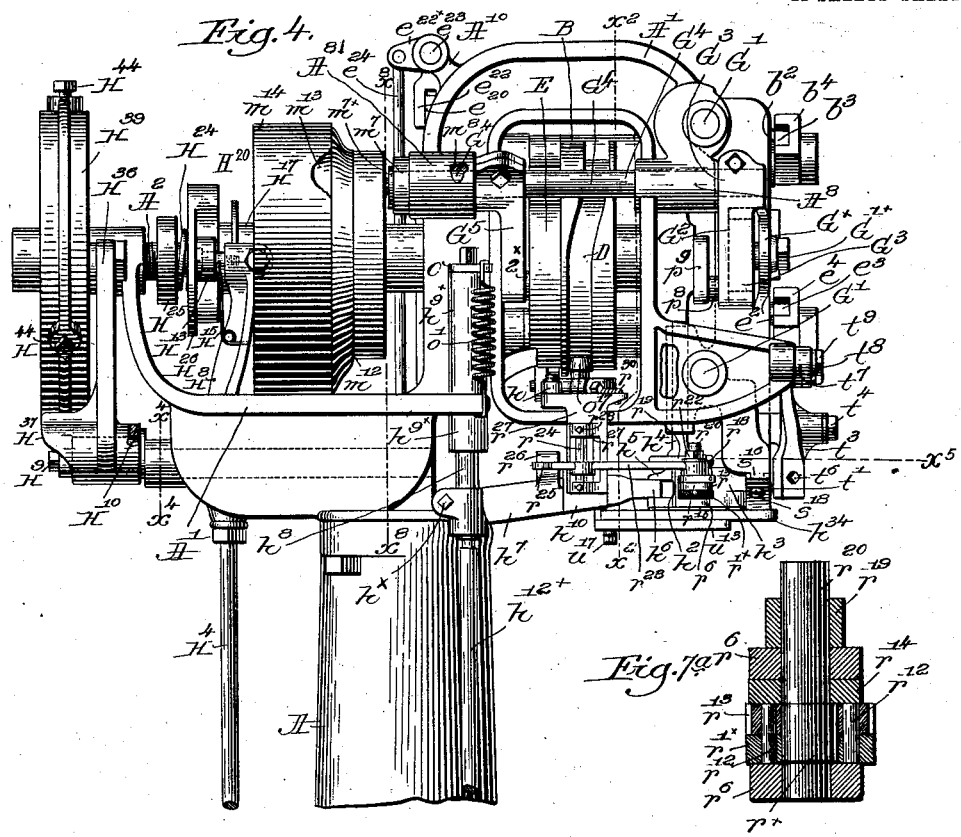
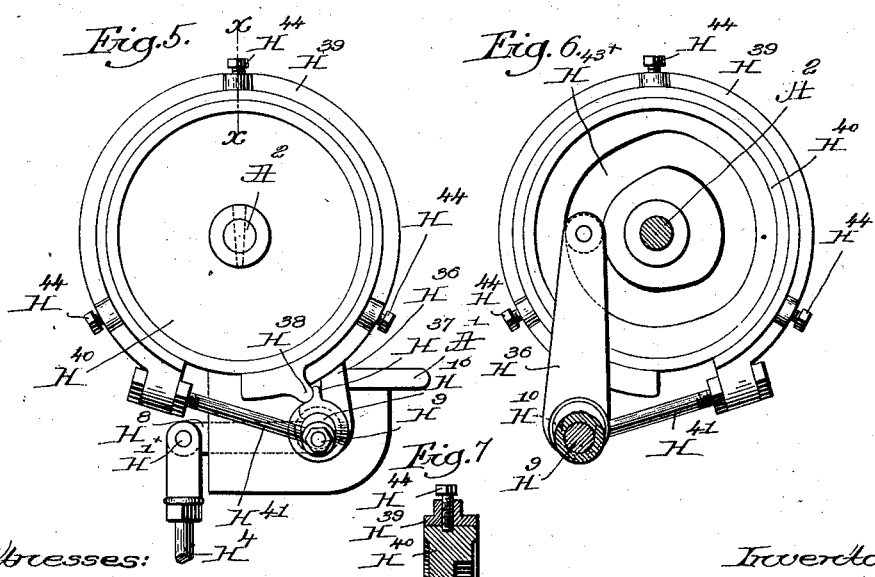
Witnesses:
Fred L. Gunhof.
Edward F. Allen.
Inventor.
Orrell Ashton,
by Crosby & Gregory
attys.

O. ASHTON.
PEGGING MACHINE.
APPLICATION FILED MAY 29, 1901.
1,021,815.
Patented Apr. 2, 1912.
12 SHEETS—SHEET 5.
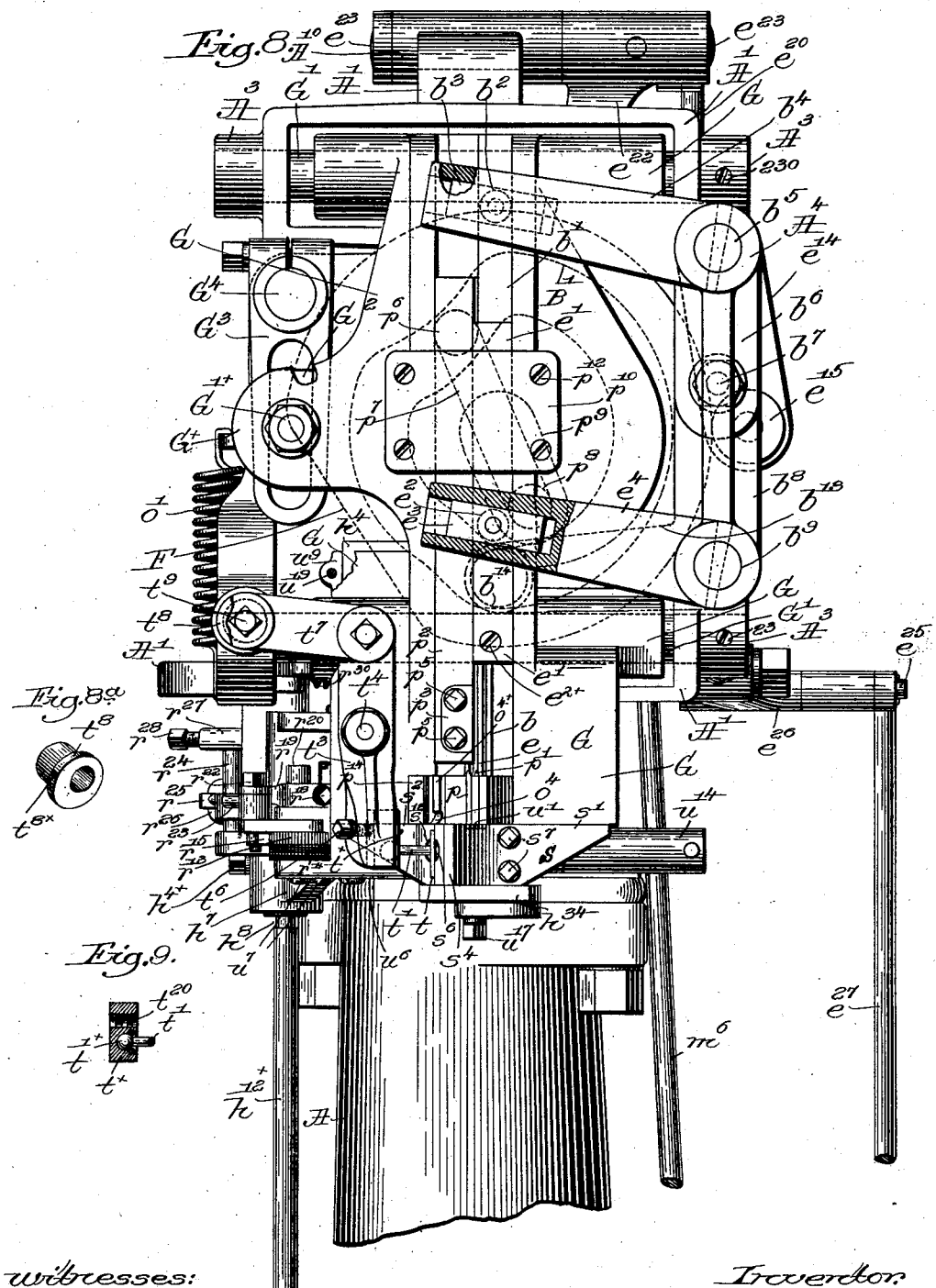
Witnesses:
Fred S. Greenleaf
Edward F. Allen
Inventor:
Orrell Ashton,
by Crosby & Gregory
attys.

O. ASHTON.
PEGGING MACHINE.
APPLICATION FILED MAY 29, 1901.

1,021,815.

Patented Apr. 2, 1912.

12 SHEETS—SHEET 6.

Witnesses:
Fred S. Greenleaf.
Edward F. Allen.

Inventor.
Orrett Ashton,
by Crosby & Gregory
Attys

O. ASHTON.
PEGGING MACHINE.
APPLICATION FILED MAY 29, 1901.
1,021,815.
Patented Apr. 2, 1912.
12 SHEETS—SHEET 7.
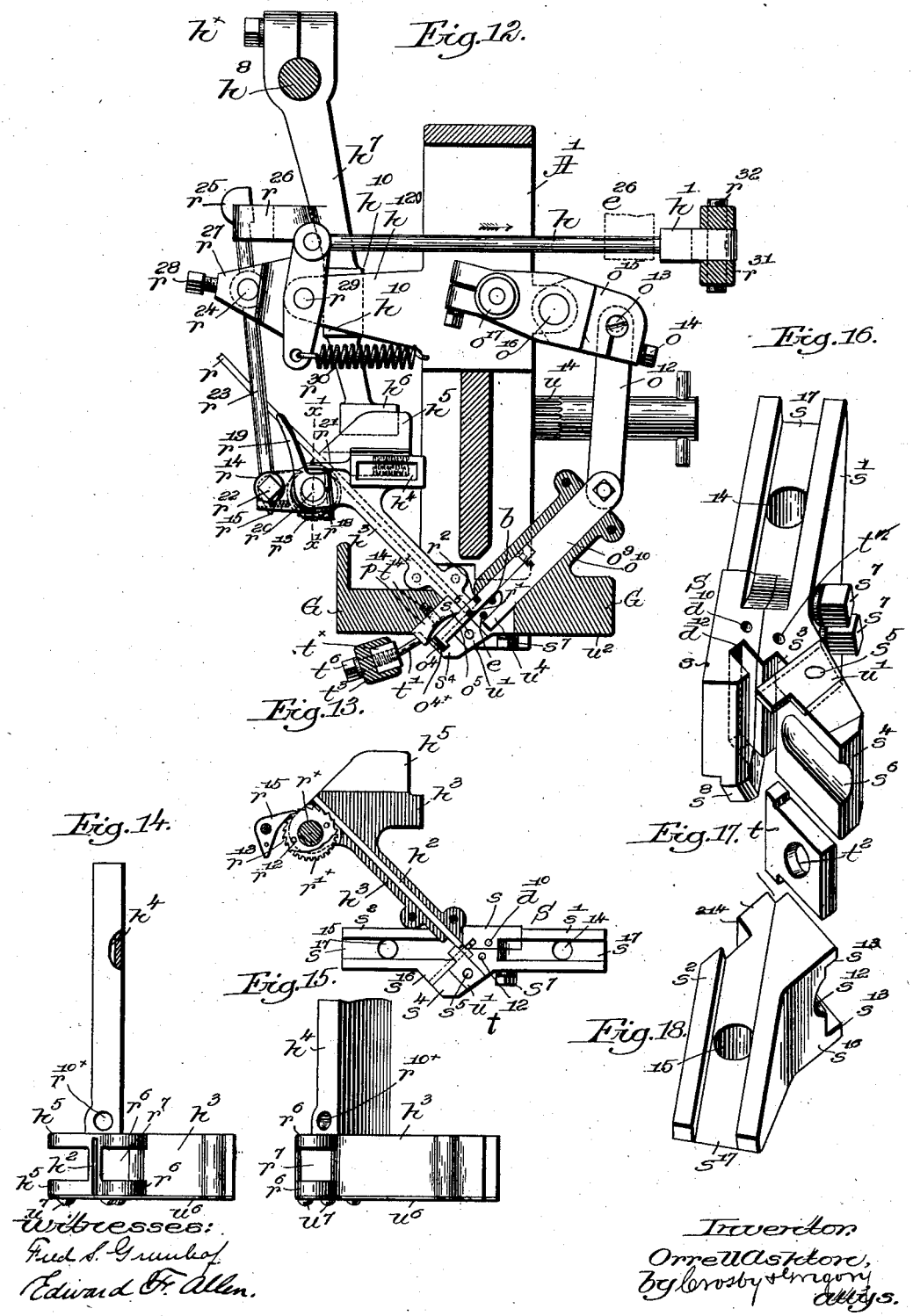

O. ASHTON.
PEGGING MACHINE.
APPLICATION FILED MAY 29, 1901.
1,021,815.
Patented Apr. 2, 1912.
12 SHEETS—SHEET 8.
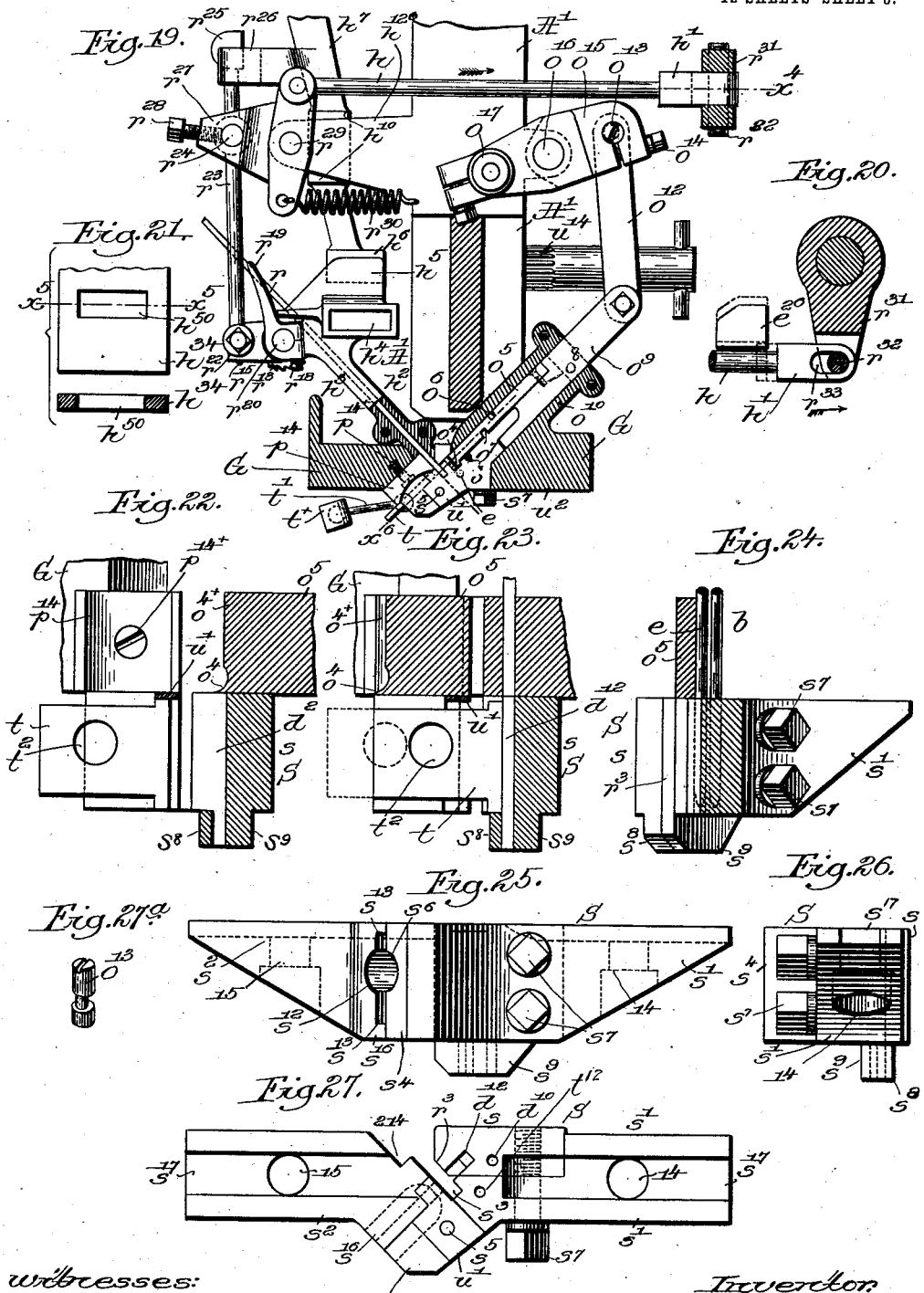

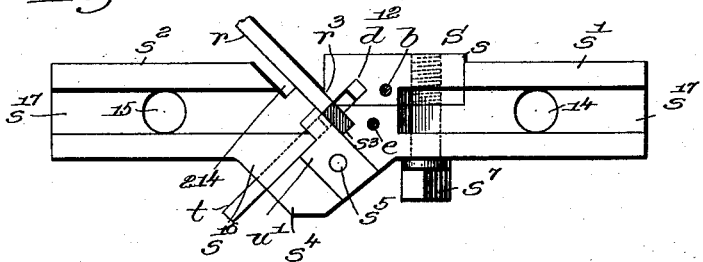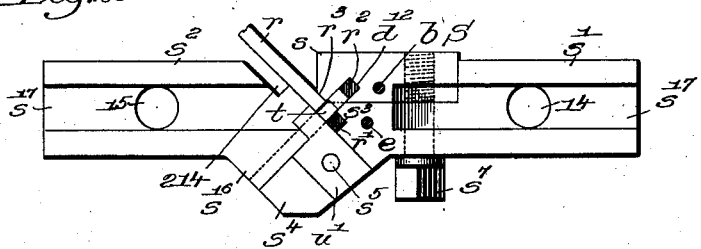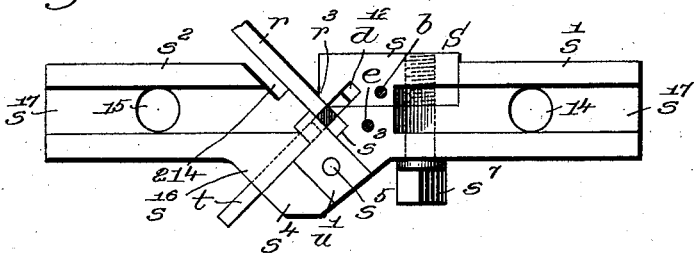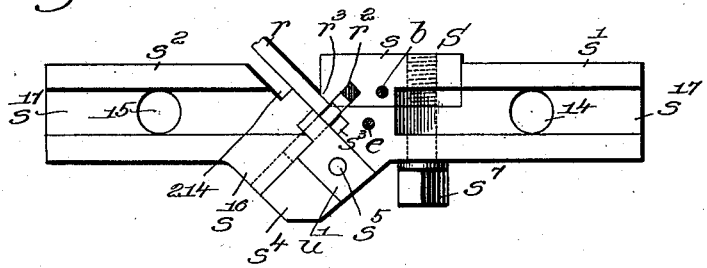

O. ASHTON.
PEGGING MACHINE.
APPLICATION FILED MAY 29, 1901.
1,021,815.
Patented Apr. 2, 1912.
12 SHEETS—SHEET 10.
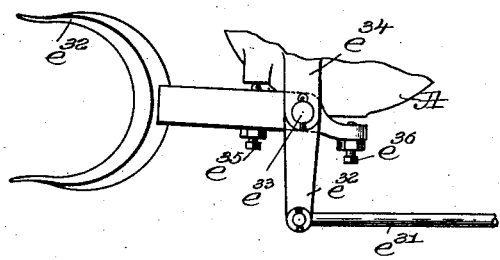
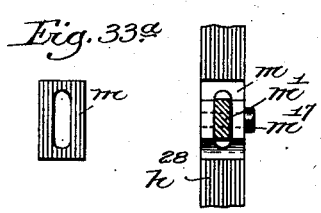
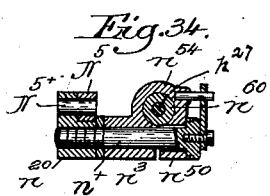
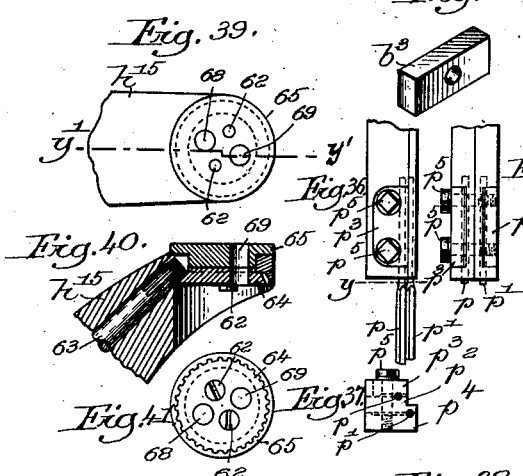
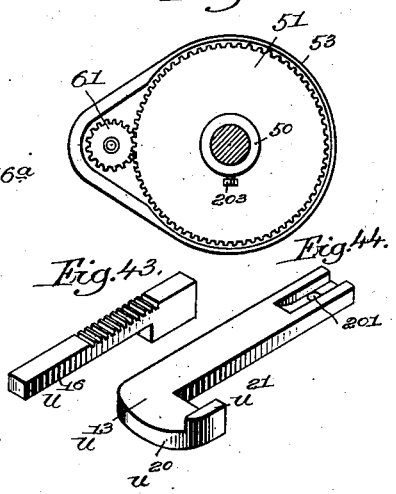
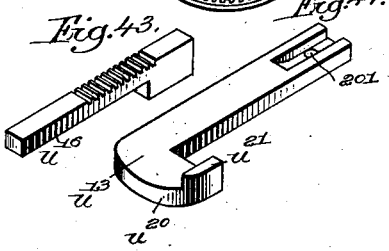
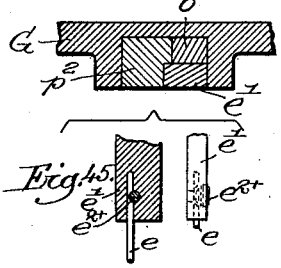
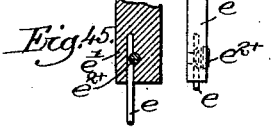
Witnesses:
Fred S. Greenleaf
Edward F. Allen
Inventor.
Orrell Ashton.
By Crosby & Gregory
Attys.

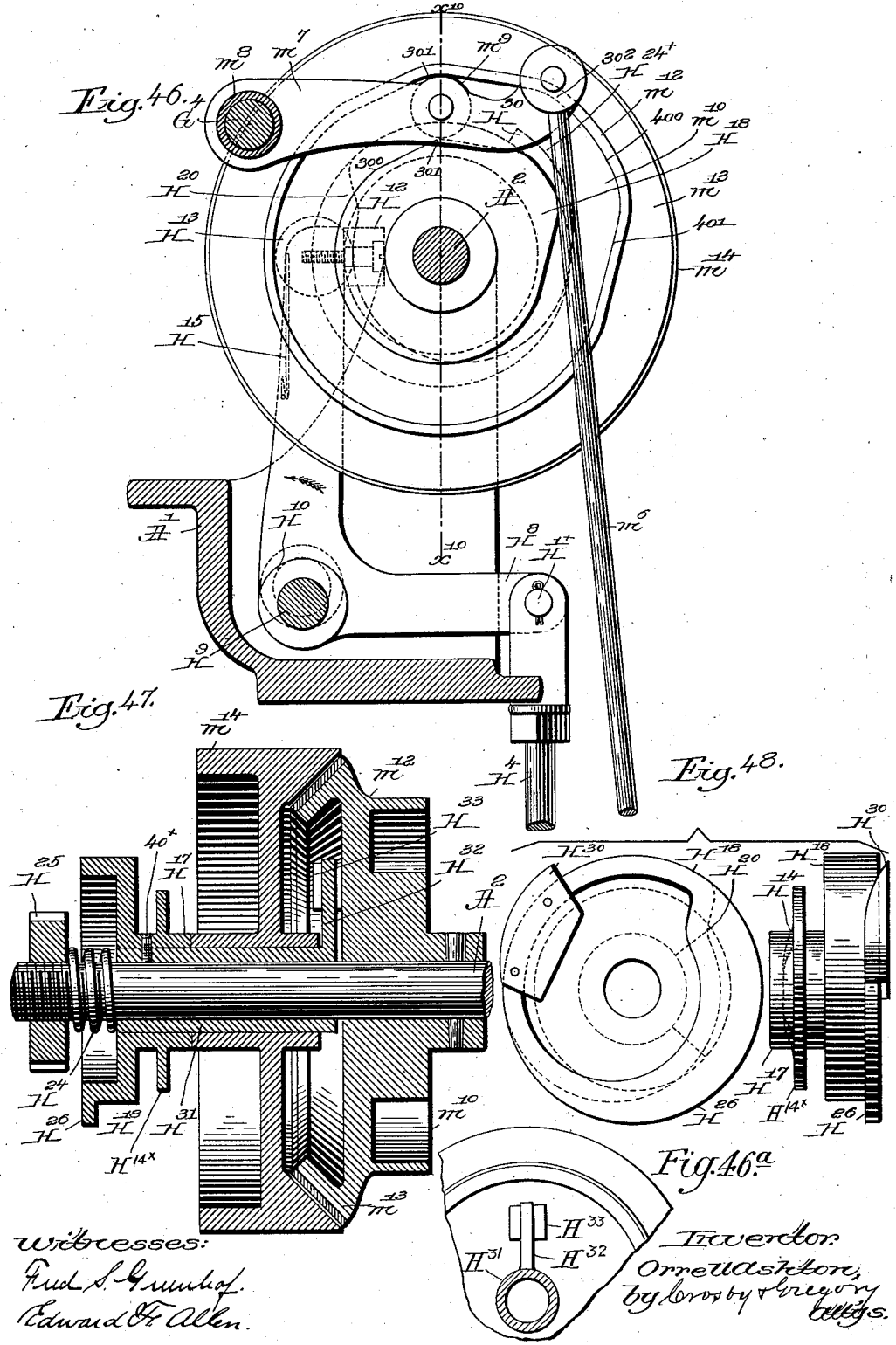

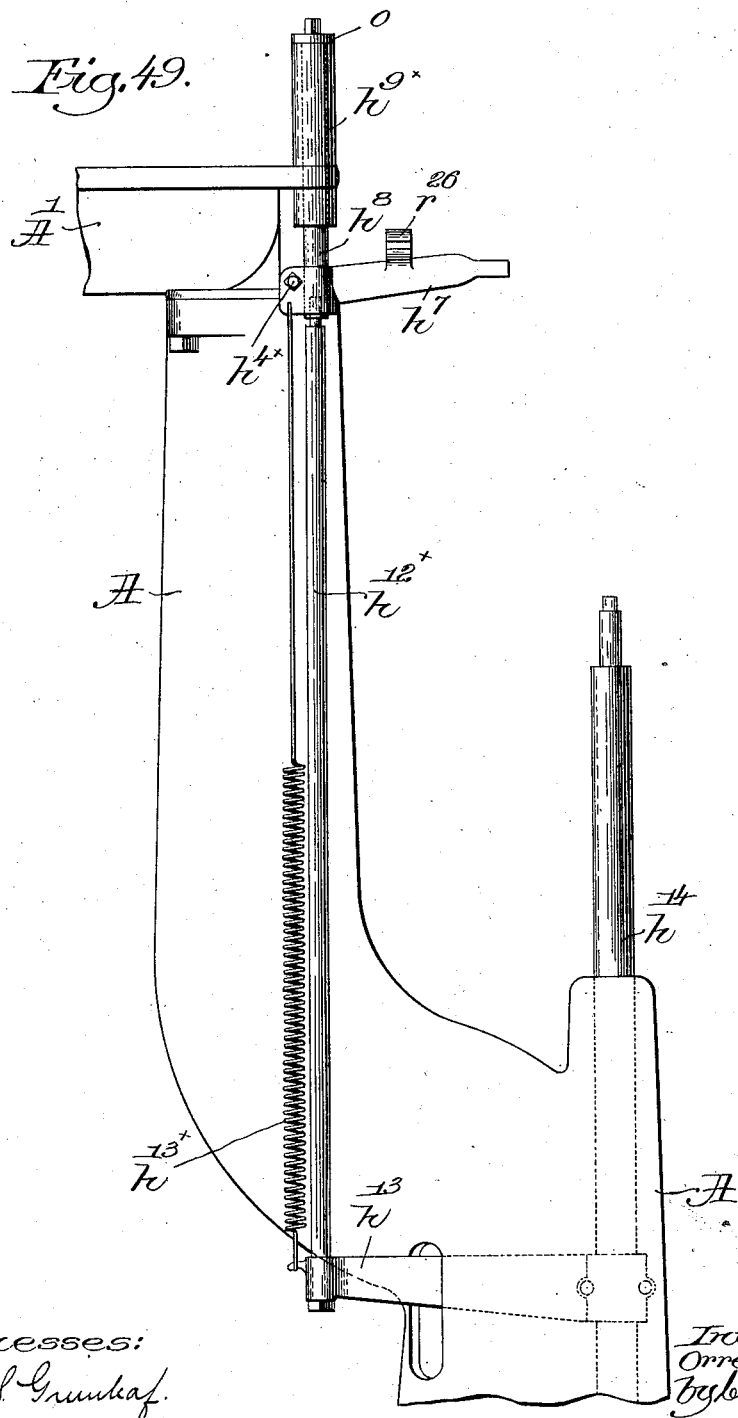

UNITED STATES PATENT OFFICE.

ORRELL ASHTON, OF LAWRENCE, MASSACHUSETTS, ASSIGNOR TO UNITED SHOE MACHINERY COMPANY, OF BOSTON, MASSACHUSETTS, A CORPORATION OF NEW JERSEY.

PEGGING-MACHINE.

1,021,815. Specification of Letters Patent. Patented Apr. 2, 1912.

Application filed May 29, 1901. Serial No. 62,341.

*To all whom it may concern:*

Be it known that I, ORRELL ASHTON, a citizen of the United States, residing at Lawrence, in the county of Essex and State of Massachusetts, have invented an Improvement in Pegging-Machines, of which the following description, in connection with the accompanying drawings, is a specification, like letters on the drawings representing like parts.

This invention relates to pegging machines and particularly to machines of the class in which pegs are severed from peg ribbon and then inserted into stock. Machines of this character are commonly used in the manufacture of boots and shoes for securing the outersole to the innersole and to the other parts of the shoe, one or more rows of pegs being driven around the sole adjacent to its edge.

The machine which is herein illustrated and described as embodying the invention in a preferred form is intended particularly for use in that class of work where it may be desired to insert a plurality of rows of pegs or other fastenings. Since the peg ribbon from which the pegs are formed is usually of wood, it is desirable, if not necessary, to form in the stock openings to receive the pegs before they are inserted and for this purpose, according to one feature of the invention, a plurality of awls are provided. In machines for pegging shoes and particularly in that class in which the shoe is fed by an awl it would be impracticable or impossible to insert two or more awls into the sole and then feed it, since the pegs or other fastenings are inserted along an irregular curved line instead of in a straight line and it is necessary to turn the shoe while it is being fed.

The invention broadly considered, therefore, comprises in one aspect a machine having a plurality of awls which are movable successively into the stock during a single cycle of operations of the machine to form awl holes in a plurality of rows extending along the line of feed of the stock, and actuating devices therefor. In the particular machine herein described one awl as, for example, one which feeds the stock is first inserted and then after the stock has been fed the other awl is inserted. Preferably the awl which first enters the stock only partially penetrates it but subsequently completes the penetration at substantially the same time that the second awl is fully penetrating the stock.

Another feature of the invention which is most useful in a machine having a plurality of awls but which may be embodied in a machine provided with only one awl is a construction whereby an awl may be rendered operative or inoperative to penetrate the stock at the will of the operator while the machine is continuously in operation. As herein shown, means is provided for feeding the peg ribbon from which the pegs are made either a distance just sufficient for forming one peg or a distance sufficient for forming a plurality of pegs. Preferably this means is arranged to coöperate with the awl controlling mechanism so that when one awl is thrown either out of or into operation the feed of the peg ribbon is correspondingly changed. Hence the machine may be operated to form and insert pegs in either one or two rows and a change may be made from one to two rows or vice versa at any time.

A further feature of the invention relates to the means for forming the pegs from the ribbon or other material and comprises mechanism for forming a plurality of pegs from a single peg ribbon or piece of material at one stroke or during a single cycle of operations of the machine. Moreover, the machine will preferably include means for forming pegs of a length corresponding automatically to variations in the thickness of the stock being pegged. In such case the peg or pegs about to be driven may be as long as the full width of the ribbon, but if thinner stock is to be pegged, the pegs will be shortened automatically to the proper length, and one feature of the invention comprises means for placing the end of a peg ribbon in the path of movement of a driver and means for forming a shortened peg from the end of the ribbon while it is in such position. In the particular embodiment of the invention herein described, the shoe or other stock to be pegged is supported upon a horn or stock support which constitutes the movable member of means for calipering the stock and which therefore insures the formation of a peg of the proper length.

In addition to the features already specified, the invention comprises certain other combinations and arrangements of parts which are fully set forth in the following detailed description and which are particularly pointed out and defined in the claims at the end of this specification. Moreover, it will be understood that the invention is capable of various other embodiments than the particular one herein specifically illustrated and described and that some of the features may be advantageously employed in other relations. Thus, while the machine illustrated is intended to form and drive wooden pegs, the invention in whole or in part may be readily embodied in machines for forming or driving other kinds of fastenings, such as nails and slugs, and the fastening material may be supplied to the machine in the form of a wire, a strip or of fastenings already separately formed.

Figure 11:
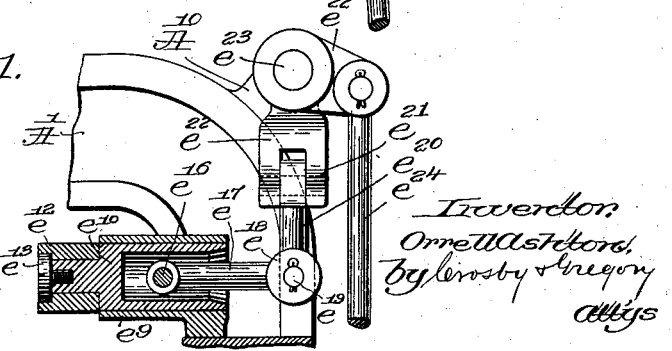

In the drawings, which illustrate a complete and operative machine embodying the invention,—Figure 1 is a right hand side elevation of a pegging machine embodying my improvements in the best form now known to me; Fig. 1$^a$ is a detail of the horn depressing and horn locking mechanism; Fig. 1$^b$ a detail showing the rods N$^4$, N$^5$, detached; Fig. 1$^c$, a detail showing the eccentric stud $m^{34}$; Fig. 1$^d$, a detail in side elevation, from the right side, of the lower part of the machine broken off from Fig. 1, the figure in connection with Fig. 1 representing one full side view of the machine, said Figs. 1 and 1$^d$ showing the machine at rest with the stock support in its lowest position; Fig. 1$^e$ is a detail showing the shouldered rod $h^{27}$; Fig. 2 shows the link $h^{41}$ detached; Fig. 3 is a detail in side elevation of the lower part of the machine from its right hand side showing the stock support elevated and the supplemental horn lowering device in its normal position, which it occupies when the machine is in continuous operation; Fig. 3$^a$ is a detail in side elevation of the lower part of the machine from the left side, the supplemental horn lowering device being in its abnormal position which it occupies when the machine is at rest; Fig. 3$^b$ is a detail of said supplemental lowering device; Fig. 4 is a partial left hand side view of the upper part of the machine; Figs. 5 and 6 show opposite views of the brake wheel and devices coöperating therewith; Fig. 7 is a section on the line $x$—$x$, Fig. 5; Fig. 7$^a$ is an enlarged vertical section taken through the peg ribbon feeding mechanism on the line $x'$—$x'$, Fig. 12; Fig. 8 is an enlarged front elevation of the upper part of the machine; the arms for operating the main and auxiliary awl bars being broken out; Fig. 8$^a$, a detail showing the eccentric stud $t^8$; Fig. 9 shows one of the slide blocks detached; Fig. 10 is a sectional detail on the line $x^2$—$x^2$, Fig. 4, corresponding approximately also to line $x^3$—$x^3$, Fig. 1; Fig. 11 is a sectional detail showing part of the awl controlling means to render one of the awls operative or inoperative; Fig. 12 is a sectional plan on the dotted line $x^5$, Fig. 4, chiefly to show the means for forming the shortened pegs; Fig. 13, a longitudinal section of the peg ribbon carrier showing the feeding mechanism coöperating therewith, and the throat for controlling the peg or pegs to be made and driven; the latter being shown in plan view; Fig. 14, an enlarged detail of the receiving end of the peg ribbon carrier; Fig. 15 is an additional view of the same part looking at it from a different position; Fig. 16 is a much enlarged detail showing part of the throat represented on a smaller scale in Fig. 13; Fig. 17 represents the peg former detached; Fig. 18 represents the peg former guide detached; Fig. 19 represents the parts shown in Fig. 12 but in different positions; Fig. 20 is a partial section on the line $x^4$, Fig. 19; Fig. 21 shows a plan view of part of the foot plate and also represents a cross section thereof on the line $x^5$—$x^5$; Fig. 22 is an enlarged sectional detail on the line $x^6$, Fig. 19; Fig. 23 is a similar view with the parts in a different position; Fig. 24 shows the throat in perspective with the two awls; Figs. 25, 26 and 27 show different views of the throat detached and enlarged; Fig. 27$^a$, a detail showing the eccentric stud $o^{13}$; Fig. 28 is a detail showing the throat with the end of a peg ribbon therein, the peg ribbon being supposed to have been acted upon by the shortening means, the peg former being in its normal or retracted position; Fig. 29 is a similar view, the peg former having been actuated to form from the end of the peg ribbon a plurality of pegs; Fig. 30 shows the same parts, the ends of the peg ribbon having been fed into the throat for a length sufficient to make but one peg; Fig. 31 is a similar view, the peg former having been actuated to form one peg from the end of the peg ribbon; Fig. 32 in plan view shows the lever actuated by the operator for controlling the auxiliary awl bar and awl; Fig. 33 is a face view of the slide bar forming part of the horn depressing mechanism; Fig. 33$^a$, a detail of the same; Fig. 34 is a sectional detail taken through the mechanism for locking the horn while the awls are operating to penetrate the stock and the pegs are being driven; Fig. 35 represents the block $b^3$ detached; Figs. 36 and 36$^a$ are detail views showing the means for clamping the drivers in place in the driver bar; Fig. 37 is a section looking upwardly from the line $y$—$y$, Fig. 36; Fig. 38 is an enlarged cross section of part of the carriage G showing the arrangement of the driver bar and awl bars therein; Fig. 39 is an enlarged top view of the horn or stock-support; Fig. 40 is a section on the line $y'$—$y'$, Fig. 39; Fig.

41 shows an underside view of the horn tip and its gear removed; Fig. 42 is a view looking upwardly from the line $y^3$—$y^3$, Fig. 1; Figs. 43 and 44 show parts of the edge gage detached; Fig. 45 shows the lower end of one of the awl bars and part of an awl clamped therein; Fig. 46 is a sectional detail on the line $x^8$—$x^8$, Fig. 4, to show the horn depressing cam and part of the stopping mechanism to insure the stopping of the machine at the proper predetermined point; Fig. 46$^a$ shows the face of the fast pulley with its lugs and the arm or projection from the sleeve entering between said lugs; Fig. 47 is a section on the line $x^{10}$—$x^{10}$, Fig. 46, of the friction clutch driving mechanism; Fig. 48 is a detail showing the stopping cam. Fig. 49 shows a modified construction of mechanism for controlling the position of the peg length changing device.

As shown in detail on the drawings, the main frame consists essentially of a column A having, at its lower end, see Fig. 1$^d$, suitable feet to rest on the floor, said column at its upper end having fixed to it, see Fig. 1, a head A′ of suitable shape to sustain the working parts to be described. The head has bearings to receive the main or actuating shaft A$^2$ provided with a suitable cam block or disk B, having five cams, two, B′ and C, made as grooves in the opposite faces of said block, and three, D, E, F, in the periphery thereof. The cam B′ imparts motion to the main awl $b$, carried by an awl bar $b'$, fitted to slide in a vertical groove in a feeding carriage G, to be described, represented as movable horizontally on like guide rods G′, fixed by screws 23 and 230 in ears A$^3$, of the head A′.

The awl bar $b'$ has extended from it, as represented, a stud $b^2$, see dotted lines Fig. 8, which enters a suitable hole in a slide block $b^3$, see Fig. 35, said block entering loosely a groove in the rear side of an arm $b^4$, secured to a rock-shaft $b^5$, having its bearing in ears A$^4$, of the head A′. Said rock-shaft has fastened to it, see Figs. 1 and 8, a second arm $b^6$, the latter arm being slidably connected, as by a suitable stud $b^7$, with an elbow lever $b^8$, having a sleeve-like hub mounted loosely on a rock-shaft $b^9$, having its bearings in suitable ears $b^{10}$ and $b^{12}$, of the head A′. The arm $b^{13}$ of said elbow lever, see Fig. 10 and dotted lines Fig. 8, has a roller or other stud $b^{14}$ which enters the cam groove B′, said cam groove imparting vertical motion in the proper time and order to the said awl bar and its awl $b$. The downward movement of this main awl is divided into two steps. The first movement of the awl causes it to penetrate the stock partially only after which the awl bar and awl are moved laterally with the carriage G, to be described, to feed the stock, and then after the carriage has completed its feeding stroke, and the horn or stock support has risen to caliper and clamp the stock, the awl completes its movement and fully penetrates the stock. These movements of the main awl bar and its awl are produced by the shape of the cam groove B′, see Fig. 10, the part thereof between the points 3 and 4 causing the awl bar and awl to descend to enter and partially penetrate the stock, the part of said cam between the points 4 and 5 holding the awl substantially stationary as to its vertical movement, while the carriage G and the main awl are being moved laterally to feed the stock over the horn, the part of the cam from the point 5 to 6 causing the further or stock penetrating descent of the awl, the part of the cam between the points 6 and 7 causing the awl bar $b'$ and the awl $b$ to be fully withdrawn from the stock, the awl bar being sustained in raised position by the cam between the points 7 and 3 while the carriage G is being returned to its starting position.

In order that the machine herein shown may be used to drive simultaneously two rows of pegs, I employ an auxiliary awl $e$, secured to an auxiliary awl bar $e'$, herein represented as shorter than the main awl bar $b'$, said auxiliary awl bar being fitted into the same groove of the carriage G as the main awl bar $b'$, see Fig. 38. The auxiliary awl bar slides vertically on or with relation to the main bar and has extended from it a stud $e^2$, which enters a slide $e^3$, like the slide $b^3$ before described, the slide $e^3$ entering loosely a groove in an arm $e^4$, pinned on the rock shaft $b^5$, said rock-shaft having pinned on it near its other end, see Fig. 1, by a pin $e^{5x}$, a second arm $e^5$ provided with a stud $e^6$ which enters a slide $e^7$, the latter entering a groove in an arm $e^8$ of a three-arm rocker-lever, the hub of which is mounted loosely on the rock-shaft $b^5$, a second arm $e^9$, see Figs. 10 and 11, receiving a sliding stud $e^{10}$, which may be provided with a roll $e^{12}$, maintained thereon as herein shown by a headed screw $e^{13}$.

The stud $e^{10}$ is acted upon by the cam lump E, see Fig. 10, on the cam block B, the said lump causing the descent of the auxiliary awl bar $e'$, so that the awl carried by it will penetrate the stock in substantial unison with the main awl $b$ while the latter is operating in the second part of its descent to penetrate the stock. These two awls pass through the stock simultaneously and they are raised from the stock in unison, the rising movement of the auxiliary awl bar and its awl being effected by a third arm $e^{14}$ of the three-arm lever before referred to. The arm $e^{14}$ has a roller or other stud $e^{15}$, which, as the lump E acts to complete the descent of the auxiliary awl, enters the depressed portion of the cam face F, see Fig. 10, and immediately thereafter in the further rotation of the shaft $A^2$ said cam face F acts on said roller $e^{15}$, and elevates the auxiliary awl bar and its awl in substantial unison with the main awl bar and its awl.

Each awl bar may be bored at its end for the reception of the shank of an awl as shown in Fig. 45, each awl being held clamped therein by a clamp screw $e^{2x}$ having its head countersunk into said bar. It may be desired to form awl holes for but one row of pegs in a portion of the stock. Hence I have provided controlling means whereby the operation of the auxiliary awl may be suspended instantly while the machine is in operation.

I believe that I am the first to employ in a machine for inserting pegs or other fastenings a plurality of awls with means, operable while the machine is running continuously, to put one of said awls into inoperative position, or to suspend its action for any desired number of operations of the machine, so this invention is not limited to the precise means herein represented as embodying this valuable feature of my invention, as it will be obvious that other forms of awl controlling means may be produced without departing from my invention.

The form of controlling device herein represented is the best now known to me, and it consists, as already partially described of a stud $e^{10}$, see Fig. 11, mounted in the lever $e^9$, said stud being moved longitudinally in or with relation to said lever, it being retracted to withdraw the roll $e^{12}$ of the stud from the path of the cam E, whenever it is desired that the auxiliary awl bar remain elevated, or in inoperative position.

The withdrawal of the stud $e^{10}$ may be, and is herein shown as effected by the mechanism now to be described. The end of the stud $e^{10}$ is recessed to receive one end of a link $e^{17}$ pivoted on a pin $e^{16}$, said link having its opposite end $e^{18}$ shaped to fit over or embrace a stud $e^{19}$, extended from a link $e^{20}$, represented as pivoted at $e^{21}$, in the slotted end of one arm of an elbow lever $e^{22}$, fastened to a rock-shaft $e^{23}$, mounted in a suitable bearing $A^{10}$ on the head $A'$. The arm $e^{22x}$ of said lever $e^{22}$, has jointed to it a rod $e^{24}$, in turn pivoted at tis lower end to a pin $e^{25}$, of a peg ribbon feed regulator $e^{26}$ to be described. The pin $e^{25}$ has connected with it at its opposite end a second rod $e^{27}$, which is represented as jointed to a lever arm $e^{28}$, having its fulcrum on a stud screw $e^{29}$, said lever having a pin $e^{30}$ over which is fitted one end of a link $e^{31}$. Said link is jointed to the short arm of a lever $e^{32}$, herein shown as shaped, see Figs. 1 and 32, to be engaged by the knee or leg of the workman who may turn said lever on its fulcrum $e^{33}$, sustained in an ear $e^{34}$, of the column A. Said lever $e^{32}$ is provided with adjusting devices represented as screws $e^{35}$ and $e^{36}$, the positions of which may be changed to provide for any desired extent of movement of the stud $e^{10}$, so that the operator may through said lever instantly put said stud in its operative or in its inoperative position as it is desired to actuate the auxiliary awl bar, or to leave it at rest in its elevated inoperative position. Whenever the lever $e^{32}$ is in the position shown in Fig. 32, both awl bars are operative, and the acting or left hand end of the lever $e^{26}$ is in its inoperative position as will be further explained.

The drivers $p$ and $p'$ are connected, see Figs. 8, 36 $36^a$ and 37, with a driver bar $p^2$, by blocks $p^3$ $p^4$ each of which bears upon the shank of a driver resting in a groove at one side of the driver bar, a screw or screws, as $p^5$, securing the drivers firmly to opposite sides of said bar. The drivers are arranged to drive pegs in two rows simultaneously and they are herein shown as positioned to drive the pegs "staggered". The driver bar near its upper end, as shown by dotted lines in Fig. 8, has extended backwardly from it a stud $p^6$ which is embraced by a link $p^7$ connected at its opposite end with a pin $p^8$ of a crank $p^9$, fast on the front end of the main shaft $A^2$, said driver bar thus being actuated positively in both directions. The driver bar enters, as shown, a guideway in the carriage G, before described, in which slide the two awl bars, the edge of the driver bar next the awl bars being notched, see Fig. 38, to leave a projection or ledge which is overlapped by the edge of the auxiliary awl bar $e'$, while the plane edge of said driver bar back of the said notch contacts with the edge of the awl bar $b'$, the awl bar $e'$ overlapping the awl bar $b'$ thus making a very compact arrangement of bars, all of which may be retained in operative position in one and the same groove of the carriage G by a suitable cap $p^{10}$, screws $p^{1a}$ holding the cap on the carriage, as shown in Fig. 8.

The carriage G, carrying the driver bar and awl bars described, has an ear $G^x$, see Fig. 8, which receives a stud $G^{1x}$ extended from a slide block $G^2$, fitted to slide in a slot in an arm $G^3$, clamped on a rock-shaft $G^4$, having its bearing in ears $A^8$, of the head $A'$. The rock shaft has a connected arm $G^5$, see Fig. 4, provided with a roller or other stud $2^x$, which enters the cam groove C, see dotted lines Fig. 10.

Viewed from the front of the machine, the cam-block B rotates in a left-handed direction, as shown by the arrow in Fig. 10, and the cam groove C is so shaped between the points 8 and 9 as to move the carriage, through the mechanism just described, in the direction to feed the stock from the right to the left over the stock support or horn $h^{15}$, to be described, the awl $b$ having partially penetrated the stock and the upward pressure of the horn upon the stock at such time being released. Then, while the part of the cam groove between the points 9 and 10 engages the stud $2^x$, the carriage is maintained stationary. The horn having risen to clamp the stock, the awl bar $b'$ is made to descend farther and its awl $b$ fully penetrates the stock, and if two pegs are to be formed and driven, the awl $e$ is also actuated to penetrate the stock, and while the awl or awls are being pulled out of the stock, the horn remains in its clamping and calipering position. While the part of the cam from 10 to 12 acts, the awls being then out of the stock, the feeding carriage G is moved backwardly or from the left to the right Fig. 8 into its normal or starting position to place the driver or drivers, above described, in line with the hole or holes in the then clamped stock, and while the part of the cam from 12 to 8 engages the stud $2^x$, the carriage is held in its normal or starting position for the drivers to descend and drive pegs, the awl bars and awls being held in elevated position ready to be again actuated.

The carriage has fixed to its lower end a nose block or throat S containing driver passages. The throat is represented detached and enlarged in Figs. 25 to 27, and is shown in parts in Figs. 16 and 18. Figs. 22, 23 and 24 represent different sections of the throat and some operative parts much enlarged. The throat S is composed of three blocks or pieces $s$, $s'$, and $s^2$. The piece $s'$ has a driver passage or notch $s^3$ in which descends the driver $p$, the end of the peg ribbon or peg strip $r$ entering said passage when two rows of pegs are to be formed and driven, the peg which is to be driven in the row of pegs farther from the edge of the stock standing in said passage. The piece $s'$ has also a passage $t^{12}$ for the auxiliary awl $e$, said piece being also shown as notched at its upper side to receive the stationary cutting member or shear block $u'$, coöperating with the peg shortener to be described, said cutter being held in position in said notch by a screw $s^5$ extended upwardly through a projection $s^4$ of said piece $s'$, the head of said screw being accessible at the underside of said projection $s^4$. The projection $s^4$ of the piece $s'$ has, see Fig. 16, a longitudinal bore $s^6$, and said piece is bored transversely to receive set screws $s^7$ which are screwed into threaded holes in the part $s$ of said throat, thereby clamping said parts together. The part $s$ has a passage $d^{10}$, see Fig 16, through which descends the main awl $b$, and a driver passage $d^{12}$ into which the peg former $t$, see Figs. 17 and 8, puts a peg to be driven in the row of pegs which is always to be inserted, said line of pegs making the outside row or, as I have herein designated it, the main row of pegs. The other part $s^2$ of the throat is notched at 214, see Fig. 27, to receive one end of a peg ribbon carrier to be described, and the offset $s^{16}$ of said piece $s^2$ is provided with a longitudinal bore $s^{12}$ corresponding with the bore $s^6$, and the projection $s^{16}$ is notched, see Fig. 18, to form shoulders $s^{13}$ to guide and sustain the peg former $t$. The parts $s'$ and $s^2$ are each longitudinally grooved at their upper sides, at at $s^{17}$, and each of said parts is provided with a vertical hole, as 14, 15, which holes receive bolts, one of which, $s^{18}$, is shown in Fig. 4, said bolts entering threaded holes in the lower edge of the carriage G, said carriage having a projection $s^{19}$, see Fig. 1, to enter the grooves $s^{17}$.

Referring briefly to Figs. 28 to 31, Fig. 28 shows the peg ribbon $r$ with its end thrust into the driver groove $s^3$, the end of the peg ribbon represented in section having been shortened by a peg shortening device to be described. This figure shows the peg former retracted and in contact with the outer face of the peg ribbon. Fig. 29 shows the peg former as having been moved to cut the peg ribbon transversely, forming two pegs $r'$ and $r^2$, $r'$ being made from the extremity of the ribbon and being left in the driver passage $s^3$, while the peg $r^2$ is punched out by the former and put by the former into position in the driver passage $d^{12}$. The peg $r^2$ is driven by the driver $p'$ in the main row of pegs which is always driven, the peg $r'$ being driven in the second or, as I style it, the auxiliary row of pegs. In Fig. 30 it is assumed that but one row of pegs is to be driven and the peg ribbon $r$ is fed only for a distance equal to the width of one peg, as will be hereinafter described, whereby the end of the peg ribbon does not enter the driver passage $s^3$ so that when the peg former $t$ is actuated it will take but one peg from the extremity of the peg ribbon, putting it in the driver passage $d^{12}$, as represented by the peg $r^2$ in Fig. 31.

The peg ribbon $r$ taken from any usual reel, not shown, and of a width equal to the longest peg to be driven, will be led into a groove or way $h^2$, see Figs. 14 and 19, of a peg ribbon carrier $h^3$, said carrier in the form in which it is herein illustrated having a hollow shank $h^4$, which is fitted loosely and made vertically movable in a guideway of the carriage G, so that said peg ribbon carrier may move laterally with said carriage, the shank being covered in said guideway by a plate $u^9$ held in place by a screw $u^{19}$, see Fig. 8. The carrier in the operation of the machine is reciprocated very rapidly, and by making the shank hollow the weight of the carrier is materially lessened, thereby reducing its momentum. The bottom of the groove of the carrier is closed by a thin steel plate $u^6$ attached by screws $u^7$, said plate sustaining the peg ribbon.

The peg ribbon carrier, see Figs. 12 to 15, has at one side of its receiving opening $h^2$, lugs or ears $h^5$, to thus form between them a slot which may receive the end $h^6$ of a peg length changing device $h^7$, shown as an arm, see Figs. 4 and 12, split at one end and clamped by a clamp screw $h^x$ on a slide rod $h^6$, adapted to slide in a guide $h^{9x}$, forming, as shown, part of the head A', the said length changing device having, as represented, an intermediate flattened part $h^{10}$, which is free to be moved vertically in and be guided by a vertical slot $h^{30}$, see Fig. 10, in a projection $h^{120}$ from the head. The lower end of the rod $h^8$, see Figs. 4 and 10, is provided with a recess to receive the upper end of a horn connection or rod $h^{12x}$, preferably reduced, as represented, to enter a recess in said rod $h^8$, or it may be a hole in the end of the arm $h^7$. The lower end of the rod $h^{12x}$ is united, preferably by a screw thread with the end of an arm $h^{13}$, see Fig. 1, attached to the horn spindle $h^{14}$, the latter supporting any usual form of horn or other support for the stock $h^{15}$.

In practice the horn or stock support moves vertically according to variations in the thickness of the stock so as to clamp and thus to caliper the stock. As herein shown and described, the peg ribbon carrier is moved vertically substantially in unison with the horn as the latter moves to clamp the stock, and this movement of the carrier provides for the formation of a peg or pegs of a length corresponding to the thickness of the stock then upon the horn, each peg, when a shoe is upon the horn, being of such a length as to have its head driven substantially flush with the outer face of the sole, the inner end of the peg preferably extending slightly beyond the inner face of the insole, so that this projecting end of the peg may thereafter be clenched or broomed, as will be described. The peg ribbon $r$ may be fed forward in the peg ribbon carrier by the mechanism now to be described. It may be noted, however, that before the machine is first started the end of the peg ribbon will be pushed through said guideway $h^2$ until the end of the peg ribbon meets one side of the peg former $t$, to be further described, which occupies, when the machine is at rest, a position, see Fig. 31, across the entrance to the driver passage $s^3$ and forming the fourth side for each driver passage, and thereafter, the machine having been started, further movement of the peg ribbon may be controlled and made automatic by the peg ribbon feeding mechanism. One good form of such mechanism is represented as a toothed wheel $r'^x$, operatively united by pins $r^{12}$, see Figs. 7$^a$ and 13, with a toothed ratchet wheel $r^{13}$, both loose on the eccentric part $r^x$ of a stud $r^{20}$ to be described, sustained between ears $r^6$, see Fig. 14, of the carrier $h^3$, the wheels resting in the space between said ears, the periphery of the feeding wheel being extended through an opening $r^7$ in one side wall of said carrier, see Figs. 13 and 14.

The stud $r^{20}$ has connected loosely with it, see Figs. 12 and 7$^a$, one end of a pawl carrier $r^{14}$, preferably located between said ears, it being provided with a spring-pressed pawl $r^{15}$, of usual construction, one end of said pawl engaging the toothed ratchet wheel $r^{13}$ and moving it and the feed wheel $r'^x$ intermittingly in one direction to feed the peg ribbon at the proper times. The upper end of the stud $r^{20}$ has clamped firmly on it by a clamp screw $r^{18}$ an arm $r^{19}$ which is normally acted upon by a spring pressed pin $r^{21}$ the shank of which enters a hole $r^{10x}$ in the carrier $h^3$, said pin acting on said arm and holding said eccentric stud $r^{20}$ in such position that the eccentric part $r^x$ thereof will keep the feed wheel $r'^x$ in contact with the peg ribbon in a yielding manner, whereby the teeth of said wheel may be made to engage the peg ribbon, whatever its thickness. The eccentric portion $r^x$ of said stud is embraced by the feeding wheel and the ratchet wheel so that change of position of the stud moves the said wheels bodily toward or from the path of movement of the peg ribbon.

To actuate the feed wheel $r'^x$ the pawl $r^{15}$ must be moved, and this may be done in the following manner: The pawl carrier may have connected with it loosely by a suitable screw $r^{22}$ a link $r^{23}$, provided between its ends, as shown see Fig. 12, with a hole to receive and fit loosely over and slide vertically on a stud $r^{24}$ in a lever $r^{27}$, the rear end of said link being flattened, as at $r^{25}$, to enter and move in a side-notch made in an ear $r^{26}$ rising from the peg ribbon carrier operating arm $h^7$, said stud $r^{24}$ and said notch insuring at all times the retention of the link $r^{23}$ substantially in horizontal position during the changing positions assumed by the carrier under the control of the horn or stock calipering means, so that said link will not be cramped or interfered with to prevent it from moving freely up and down on the stud $r^{24}$. To impart to the link $r^{23}$ its to and fro movement to actuate the feed wheel, I have mounted the stud $r^{24}$ in ears, see Fig. 4, of the lever $r^{27}$ pivoted at $r^{29}$ on the projection $h^{120}$, the said stud being confined in said lever by a clamp screw $r^{28}$. The lever $r^{27}$ acted upon at one end by the spring $r^{30}$ to move the pawl $r^{15}$ back over the wheel $r^{13}$, is moved in opposition to said spring by the feed regulator rod $h$. This rod is actuated by an arm $r^{31}$, provided with a pin $r^{32}$, see Figs. 1, 10, 12, and 20, entering a slot $r^{33}$ in the head of the said rod $h$.

The arm $r^{31}$ projects from the hub of the lever $b^8$ which forms part of the actuating mechanism for the main awl already described.

The rod $h$ has imparted to it its feed actuating stroke in the direction of the arrow, see Fig. 12, while the main awl is being withdrawn from the work, and in this movement the head of said rod is always put into the same position, thereby always carrying the pawl to a certain defined forward position. The extent of movement of the feed wheel may, however, be varied by controlling the extent of backward movement of the pawl carrier $r^{14}$, and consequently it becomes possible to feed the peg ribbon for a greater or less distance, as may be desired, as when one or a plurality of pegs are to be made at one operation of the machine. Should it be desired to make but one peg at an operation, the left hand end of the feed-regulator $e^{26}$, viewing Fig. 1, will be lowered from the position shown in Fig. 10 and by dotted lines in Fig. 20 and put into the position shown by full lines, Fig. 20, while the arm $r^{31}$ is being moved to draw the rod $h$ to the right in the direction of the arrow, Fig. 19, thus placing said regulator in position to be struck by the head $h'$ of said rod $h$ as said rod is being moved to the left by spring $r^{30}$, the main awl-bar and awl then descending. After the head $h'$ meets regulator $e^{26}$, the pin $r^{32}$ of the arm $r^{31}$ moves in the slot $r^{33}$ of the head $h'$ during the remainder of its full stroke, said pin having lost motion in said slot, yet always moving the rod $h$ to the right for its full distance whenever $r^{31}$ is turned in the direction of the arrow, Fig. 20.

I have so cut the teeth on the ratchet wheel $r^{13}$ that the pawl $r^{15}$ on the back stroke of the pawl carrier $r^{14}$ will pass two teeth when two pegs are to be formed, but in case only one peg is to be formed as when the regulator $e^{26}$ is put in its operative position to arrest the rod $h$, as stated, in the backward or inoperative movement of the pawl carrier, then the movement of said pawl is sufficient to enable it to pass but one tooth. The foot plate $h^{34}$ is slotted at $h^{50}$, see Fig. 21, to receive the lower end of a nose $s^8$, $s^9$, projected downwardly from the parts $s$ and $s'$ of the multi-part throat S, before described. The foot plate is held in place by a set screw $u^{17}$, extended through and holding in place an edge gage $u^{13}$. The ends of the portions $s^4$ and $s^{16}$ of the parts $s'$, $s^2$, of the throat when said parts are secured to the carriage, as stated, form a guideway for the peg former, shown best in Fig. 17, it having a hole $t^2$. The bore $s^6$, $s^{12}$, and the hole $t^2$ receive the ball-like end of a universal or ball link $t'$, see Figs. 8, 12 and 19. The opposite end $t'^\times$ of said universal link or connection is also of ball shape and enters a ball-socket in the block $t^\times$, see Fig. 9, in a groove of a lever $t^3$, said block having a threaded hole $t^{20}$ which is entered by a screw $t^6$, see Fig. 12. The lever $t^3$ pivoted on a stud $t^4$ fixed to the carriage G, has its upper end jointed loosely to a link $t^7$ having at its outer end a hole which fits loosely over an eccentric stud $t^8$, see Fig. 8$^a$, said link being held on said eccentric stud by a suitable cap screw $t^9$, entering a tapped hole in a part of the head A'. As the link $t^7$ is held at one end fixedly as stated with relation to the head, it follows that as the feeding carriage is reciprocated, the lever $t^3$ and the peg former will be moved in the same direction as the said carriage but for greater distance, thus causing the peg former to slide in the guideway described for it in the throat, also attached to the carriage. The eccentric sleeve $t^8$ is provided with holes $t^{8\times}$ which may be engaged to turn the eccentric and thus determine the position of the acting end of the peg former that it may be stopped at the inward stroke at just the proper point so that said former, when a peg or pegs are being driven, may occupy a position to close the open side of and constitute one side of each of the driver passages, see Fig. 29.

The peg ribbon carrier $h^3$ is limited in its downward movement by a stop $o$ applied to the upper end of the slide rod $h^8$, which meets the top of the guide $h^{9\times}$ stopping the arm $h^7$ and the peg ribbon carrier in its lowest possible position, herein designated as its normal position, with the plate $u^6$ resting just above the top of the nose or foot plate or block, see Fig. 4, a position it will occupy in case the pegs being formed are of a length equal to the full width of the peg ribbon. The spring $o'$ acts to keep the lower end of the slide rod $h^8$ always in contact with the upper end of the rod $h^{12\times}$ as the horn ascends to caliper and clamp the stock. Fig. 49 shows a modification of this construction in which the rods $h^8$ and $h^{12\times}$ are kept in contact by a spring $h^{13\times}$ extending from the arm $h^7$ to the arm $h^{13}$. Such a yielding connection between rods $h^8$ and $h^{12\times}$ in the mechanism connecting the horn and the peg ribbon support or carrier is provided in order that the horn may be lowered when it is desired to remove the work from the horn or apply new work to the horn without effecting a corresponding movement of the peg ribbon support. This is an important feature of my invention as it would be undesirable and impracticable for the peg ribbon support to have as great a movement as the horn when the horn is depressed for the putting on or removing of the work.

The peg shortening device herein shown, embodying my invention in one practical form, consists of a plate $O^5$ presenting a sharp front edge $o^4$, see Figs. 12, 19, 22 and 23, and is carried by a slide bar $o^9$, free to slide in a guideway $o^{10}$ forming part of the carriage G, said slide bar having jointed to it at one end a link $o^{12}$, the opposite end of which surrounds an eccentric stud $o^{13}$ shown detached in Fig. 27$^a$, adjustably held clamped in a lever $o^{15}$, as by a clamp screw $o^{14}$, said lever having its center of motion at $o^{16}$ and being provided with a roller or other stud $o^{17}$ clamped in said lever by a clamp screw, see Figs. 10 and 19, said stud entering and being actuated by the cam groove D. The plate $o^5$ has at its opposite sides transverse grooves $o^6$, $o^7$, forming driver passages, and said plate has holes to receive screws $o^8$, shown by dotted lines Fig. 19, entering threaded holes in the bar or carrier $o^9$, before described, and connecting said plate with said bar. By adjusting the eccentric stud $o^{13}$, the driver grooves $o^6$ and $o^7$ may be exactly positioned, as required, for the passage therethrough of the drivers $p$ and $p'$, before described.

The peg shortening device is represented as so arranged that it may be moved in a path substantially at right angles to the groove in the peg ribbon carrier, and the edge $o^4$ of the shortener meets the peg ribbon supported at its opposite side by the cutter or block $u'$ and cuts the ribbon in the direction of its length to determine the length of the peg to be formed. After the edge $o^4$ cuts in this way into the ribbon longitudinally, a further movement of the shortener causes the vertical edge thereof to act in connection with one edge of a shear block $p^{14}$, held in place by a screw $p^{14x}$, to complete the separation of the surplus material not needed in the peg from the ribbon by a vertical cut extending from the longitudinal cut made by the edge $o^4$ to the upper edge of the ribbon, such surplus wood being discharged through the open space above the throat S. Thus, so much of the peg wood or ribbon as is not required for the peg or pegs about to be formed and driven is removed, so that the peg or pegs are shortened according to the thickness of the stock, since the quantity of material removed as surplus is diminished for thicker stock, and vice versa. During this operation of the peg shortener the peg former $t$ is retracted, as shown in Figs. 19, 22, 28 and 30. If two pegs are to be made, the peg ribbon would have been fed far enough to place its end in the driver passage $s^3$, see Fig. 28, before the peg shortener was operated, so that as the peg former is moved it will act on the ribbon and cut it transversely on two lines back from its front end. In this operation, see Fig. 29, it will make two pegs $r'$ and $r^2$, the peg $r'$ being made from the extremity of the peg ribbon, while the peg $r^2$ is taken from between that peg and the body of the peg ribbon, the rear side of the peg ribbon acted upon by the peg former being sustained by the face $r^3$ forming part of the throat piece $s$. The peg $r^2$ is put by the former into the peg driver passage $d^{12}$ in line with the driver $p$, while the peg $r'$ is left in the peg driver passage $s^3$ in the path of movement of the driver $p'$, and the peg former having arrived in the position shown in Fig. 29, both drivers descend simultaneously and drive the two pegs. If but one peg is to be driven at a time, then the action of the auxiliary awl bar and awl will be suspended, as has been hereinbefore described, the feed regulator $e^{26}$ being put in position to meet the head $h'$ of the rod $h$ and arrest it so that the stroke of the pawl carrier and pawl $r^{15}$ will be shortened to move the peg ribbon for a less distance, corresponding to the width of one peg, putting the free end of the ribbon in the position indicated in Fig. 30. In that position the peg shortener will act as before described, and when at the proper time the peg former is actuated to meet the peg ribbon, it will cut therefrom but one peg, moving that peg before it into the driver or peg passage $d^{12}$, from which it will be driven by the driver $p$, the stroke of the other driver which descends as usual, having no effect.

If it is desired for any reason to withdraw the peg ribbon from the machine, the operator will press upon the handle $r^{19}$ and turn the eccentric stud $r^{20}$, carrying the peg ribbon feeding device and ratchet wheel, thus removing the feeding device from contact with the work. The edge of the stock being pegged will be held by the operator against the edge gage $u^{13}$, made movable toward and from the paths of the awls and drivers by a suitably mounted pinion $u^{14}$, represented in Figs. 1, 8, and 12. The teeth of said pinion engage teeth formed in a block $u^{16}$, shown detached in Fig. 43, connected to the edge gage $u^{13}$ by a set screw $u^{17}$, extended through a hole 201 and entering a threaded hole in the block $u^{16}$, the block and edge gage being guided by the foot plate $h^{34}$. The pinion $u^{14}$ and its shaft may be held in adjusted position by means of a spring $u^{18}$, herein represented as attached to the head of the machine by a screw 202, said spring extending forward and coöperating with teeth of a wheel or ratchet on the shaft.

Viewing Fig. 44 it will be noticed that the edge gage has an extended lip $u^{20}$ with an upwardly turned projection $u^{21}$ which engages one side of the foot plate, and the face of the lip is rounded. An edge gage so made prevents any possibility of the work catching between the edge gage and the foot plate. The horn spindle $h^{14}$ has fixed to it by a set screw 203 the hub 50 of a gear 51, and above said gear said spindle has fitted loosely to it a sleeve 52 having a gear covering flange or skirt 53. The sleeve 52 has screwed into its upper end a hollow ring or collar 54, the lower end of which rests upon a shoulder 55 made near the upper end of the horn spindle $h^{14}$, and by adjusting this collar in the split upper end of the sleeve 52 the height of the horn may be adjusted with relation to the spindle, a nut as 56 applied to the threaded upper end of the horn spindle co-acting with the collar carried by the sleeve 52. This sleeve 52 has projecting from it a split hub 57 in which is inserted the shank 58 of the horn $h^{15}$, said shank being clamped in said split portion by a clamp screw 59. The horn has extended through it a shaft 60 provided at its lower end with a pinion 61 which is driven from the gear 51. The upper end of the shaft 60 has a bevel toothed gear $61^x$ which engages with a bevel toothed gear $62^x$ at the lower end of a diagonal shaft 63, in turn provided at its upper end with bevel teeth which engage, see Fig. 40, teeth of a gear 64 secured by screws 62 to the lower side of a combined awl receiver and peg clenching or brooming device 65, said device having its shank extended through a hole in the upper end of the horn, and being maintained in place by the gear 64.

The sleeve 52 and the horn are revoluble about the horn spindle $h^{14}$, this being necessary in order that the shoe placed thereon may be properly presented under the nose for the reception of the peg or pegs. It will be obvious that the combined awl receiver and peg clenching or brooming device must be non-rotatable in order that the holes 68, 69, may be maintained, no matter what the position of the horn; always in exactly the same relation to the awls as the latter descend so that each awl on passing through the stock may always descend through its own passage in the device 65, and so also when the pegs are driven the end of each peg may if desired enter slightly said hole or holes.

It will be understood that the horn is slightly depressed in usual manner, as will be described, between successive peg driving operations in order that the shoe or stock may be fed over the horn, and it will be obvious that the ends of the pegs, projecting slightly through the stock at the inner side of the inner sole will during the feeding of the stock be brought over the plane surface at the top of the device 65, and as the horn, after its depression for feeding, is lifted to clamp the stock preparatory to again driving pegs therein, the pegs last driven will be acted upon and compressed in the direction of their length between the foot plate and the device 65, such compression being sufficient to clench or broom somewhat the protruding ends of the pegs at the inner side of the stock.

The main shaft $A^2$ has secured to it a fast pulley $m^{12}$ having a conical friction face $m^{13}$ at one end, said face being recessed, see Fig. 47, and provided with two lugs $H^{33}$, see Fig. 46$^a$, and at its opposite end said pulley has a cam groove $m^{10}$ for operating the horn or stock support. The shaft $A^2$ receives loosely a sleeve $H^{31}$ one end of which has fixed to it the stopping cam block $H^{18}$, the opposite end of said sleeve having extended therefrom a projection or arm $H^{32}$ that enters the space between the two ears $H^{33}$, said ears through said arm and sleeve determining the proper operative relation of said cam block and the fast pulley having the groove for controlling the movements of the horn. The pulley $m^{14}$ supposed to be driven continuously embraces the sleeve $H^{31}$ loosely, and is restrained from longitudinal movement thereon by the projection $H^{32}$ and the end of hub $H^{17}$ of said cam-block, said hub being secured to said sleeve by a screw $40^x$. The shaft $A^2$ is surrounded outside said cam block by a spring $H^{24}$ which, when permitted, will act to move the sleeve and its loose pulley laterally on the shaft $A^2$ that the conical recess in the face of said loose pulley may contact frictionally with the cone-shaped part of the fast pulley to start said shaft in motion. The opposite end of the spring is backed up by an adjusting device $H^{25}$, shown as a nut screwed onto the shaft $A^2$. The stopping cam block presents externally a depression $H^{20}$ which determines the exact time of separation of the two clutch pulleys to let the shaft $A^2$ be stopped always at a defined point and put the operating cams carried by said shaft in a defined starting position.

The surface of the cam block $H^{18}$ is so cut as to leave at one end a projection $H^{26}$, said projection being prolonged or terminated at one end by a switch block $H^{30}$, see Fig. 48, said block being adapted at the proper time to act by its cam face against a roller stud $H^{13}$, see Fig. 46, carried by the starting lever $H^8$, and put said roller in position to be acted upon by the acting face of the cam block $H^{18}$, in order that it may at the proper time enter the depression $H^{20}$ therein, as shown in Figs. 4 and 46, at which time the machine is in position to be stopped by the application of a suitable brake now to be described. The hub $H^{17}$ of the stopping cam block has a flange $H^{14x}$ having at one side, see dotted lines Fig. 48, a cam-lump $H^{14}$ that acts against the roll $H^{12}$ carried by the lever $H^8$ when the roller $H^{13}$ of said lever enters the space $H^{20}$, said lump by its contact with said roller $H^{12}$ causing the sleeve $H^{31}$ to be moved to the left, Figs. 1 and 47, to remove the loose pulley from its driving engagement with the fast pulley, and at the same time compress the spring $H^{24}$.

The shaft $A^2$ has fixed upon it at one end a brake pulley $H^{40}$ having cut in one face a cam groove $H^{43x}$, see Fig. 6. This pulley has in its periphery a groove, see Fig. 7, into which enter the ends of screws $H^{44}$ carried by a metallic brake band $H^{39}$ embracing the periphery of said pulley. The band $H^{39}$ receives in a hub at one end thereof an adjustable rod $H^{41}$ fitted, see Figs. 4, 5 and 6, to the projecting reduced end of a shaft $H^9$ having just back of said end an eccentric $H^{10}$, see dotted lines Fig. 46, said eccentric being surrounded by the hub of a lever $H^{36}$, said hub having at its left hand side, see Fig. 4 and also Fig. 5, a toe $H^{37}$ which, as said lever $H^{36}$ is moved by the cam groove $H^{43x}$, acts against a lug $H^{38}$ at one end of said brake band, causing it to firmly grasp the brake pulley immediately after the roller $H^{13}$ enters the space $H^{20}$ to effect the separation of the pulleys $m^{12}$, $m^{14}$ preparatory to stopping the machine.

To start the machine, the operator will put his foot on the treadle H pivoted at H', see Fig. 1$^d$, and will lift the rod $H^4$, turning the lever $H^8$ and the shaft $H^9$ upon which it is pinned at $H^{90}$, Fig. 1, turning said lever in the direction of the arrow thereon, see Fig. 46, removing the roller stud $H^{12}$ carried thereby from contact with the cam lump $H^{14}$ on one part of the cam block $H^{18}$, see Fig. 48, thus permitting the spring $H^{24}$ to act and close the clutch pulleys, such movement also, by turning said shaft $H^9$, actuating the eccentric $H^{10}$ and removing the toe $H^{37}$ from the brake band, thus freeing the brake, and as long as the lever $H^8$ is held in the position in which it is put by the operator's foot, the brake will not act although the brake lever is operated continuously by the cam $H^{43x}$.

The operation of the parts for stopping the machine will be hereinafter further described.

Before describing the horn and its actuating mechanism for calipering the stock, for depressing the horn to permit the stock to be fed, and for giving it a greater depression to permit the stock to be removed from or applied to the lowered horn, I will say that the horn is self-adapting, as by a spring $h^{31}$, to the varying thickness of the stock in usual manner, and that to enable the stock to be unclamped that it may be fed over the horn, said horn is lowered from the underside of the stock a defined distance always substantially the same whatever the thickness of the stock, such lowering of the horn for feeding the stock being also common, but effected herein by novel mechanism. Also the machine herein to be described is provided with novel mechanical means whereby when the machine is to be stopped the horn is lowered into a position to afford ample space for the removal or application of the stock, said lowered position being hereinafter designated as its abnormally low position. It will be understood that the top of the horn in its abnormally low position occupies a position below the foot plate which varies with the thickness of the stock, but which is lower than the position which it occupies during the feeding of the stock, so that the distance between the foot plate and the horn when the machine comes to rest exceeds by a predetermined amount the thickness of the stock last pegged.

In the machine herein described I have provided means for locking the horn in position during the time that the awls act to penetrate the stock, and while the drivers act to insert a peg or pegs, or other fastening, said locking means being unlocked during the feeding of the stock. The horn connection instrumental in lowering the horn for feeding, contains the supplemental lowering means to put the horn in its abnormally low position for removal of the stock. Said lowering means is locked and held positively in its normal position during the operation of the machine, said means being unlocked to put the horn in its abnormally low position as the machine is stopped.

By lifting the bar $h^{28}$ at the proper times the horn may be depressed for feeding the stock. This has usually been done by a pawl carried by a bar moved vertically with a constant stroke and engaging one or another of a series of cross teeth in a bar connected with the horn according to the position of the horn determined by the thickness of the stock, as provided for in United States Patent 265,227, dated Sept. 26, 1882. Herein I have dispensed with the pawl for depressing the horn, and instead I employ a lever $m^7$, see Fig. 46, having a sleeve hub $m^8$ entering loosely the bearing $A^{81}$, see Fig. 4, and surrounding the shaft $G^4$, said sleeve being retained in said bearing by a screw and washer $m^{7x}$, see Fig. 4. The lever $m^7$ has a roller or other stud $m^9$, see Fig. 46, which enters the cam groove $m^{10}$ in the face of the fast pulley, said groove having two steps, as from 300 to 301 and from 301 to 302, which act one after the other in each rotation of the fast pulley to lift the free end of said lever and its attached rod $m^6$ jointed to the slide bar $m^3$, which differs somewhat in its construction from the slide bar shown in said patent.

The slide bar $m^3$, see Figs. 1 and 1$^a$, is reciprocated uniform distances by cam groove $m^{10}$, while the machine is in continuous operation. The bar is slotted at $m^x$ to receive the end of a finger $m'$ pivoted on a pin $m^{33}$ passing through said bar. The free end of said finger rests normally on and is pressed toward a stationary knock-off device or dog $m^{20}$ by a spring $m^{19}$. A clamp $m$ having a slot for the passage of the finger $m'$ and, if desired, grooved on its face as shown in Figs. 33 and 33$^a$, is pivoted on said finger by a stud $m^{34}$ shown detached in Fig. 1$^c$, which stud has an eccentric portion $m^{18}$. The threaded part of the stud $m^{34}$ receives a nut $m^{17}$ and the end of the stud is slotted to receive a screw driver, so that, the nut being released from the clamp, the stud may be turned to move the face of the clamp $m$ toward and from the bar $h^{28}$. The dog $m^{20}$ is pivotally mounted on the stud $m^{21}$, so that one end of the dog is farther from the stud than the other, as shown in Fig. 1. Either end of the dog may be turned upwardly into operative position. This dog determines the point in the upward movement of bar $m^3$ at which the clamp $m$ will be permitted, under the influence of spring $m^{19}$ and finger $m'$, to engage the bar $h^{28}$ to connect the said bars and thus effect the depression of the horn, and the dog also determines the point in the downward movement of the bar $m^3$ at which the finger $m'$ will be turned to cause the clamp to disconnect said bars, whereupon the spring $h^{31}$ acts immediately to elevate the horn to clamp and to caliper the stock whatever its thickness may be. While the bar $m^3$ is being lifted by the step of the cam $m^{10}$ extending from 300 to 301, the finger $m'$ remains in contact with the dog, the clamp sliding upwardly with the bar $m^3$ over the bar $h^{28}$, but during this time the clamp gradually approaches the bar $h^{28}$, and as soon as the clamp firmly grips the said bar the finger leaves the end of the dog with which it has been in contact, and as the bar $m^3$ is given its final upward movement by the step 301 to 302 of said cam, the bar $h^{28}$ is also lifted and the horn is depressed to permit the work to be fed. The part 301 of the cam $m^{10}$ constitutes a slight dwell during the action of which the main awl $b$ enters the clamped stock, far enough to get a sufficient hold thereof to feed the same, before the bars $m^3$ and $h^{28}$ are lifted together to depress the horn.

It will be noted that the clamp $m$ engages the bar $h^{28}$ at different places according to the vertical position of the bar, which depends on the thickness of the stock between the horn and the foot plate. It is found also that the grooving vertically of both the bar and the clamp, as described, offers extended, durable, gripping surfaces, and such construction is considered preferable to the pawl and ratchet construction in common use, in which the ratchet teeth sometimes are broken out. With applicant's construction, also, adjustments may be made more readily than with the prior construction referred to.

As already stated the horn is locked in its clamping position while the awl or awls act, and while a peg or pegs are being driven into the stock. This I provide for in the following manner, viz., the rod $h^{27}$ is extended loosely through a sleeve $n^{60}$, see Fig. 34, located just below the point of attachment of said rod with the lower end of the bar $h^{28}$, and said rod is reduced in diameter to provide a suitable shoulder see Fig. 1$^c$ on which may rest the lower end of said sleeve, a nut $n^{61}$ on said rod acting on the upper end of said sleeve and keeping it seated on said shoulder. The sleeve $n^{60}$ is passed through a clamping block $n^{54}$, see Figs. 1 and 34, shown as split and carried by a cap $m^5$ used to keep the bars $m^3$ and $h^{28}$ in a suitable guideway of the machine, said cap being held in place by suitable clamp screws $n^4$. The clamping block $n^{54}$ referred to is closed to clamp the sleeve $n^{60}$ embracing the rod $h^{27}$ and hold the same in fixed position during the operation of the awls and driver, by drawing a headed stud $n^x$ to the left, viewing Fig. 34, such movement being effected by an armed nut $n^{20}$ screwed upon a left-hand thread, see Fig. 34, of said stud, said nut receiving its movement for such purpose from a pin $N^{5x}$ extended into a hole in said nut from a rod $N^5$ having its upper end jointed at $N^6$, see Fig. 1$^a$, to the bar $m^3$. The lower end of said rod $N^5$, see Fig. 1$^b$, at a point below the armed nut is in turn jointed to a rod $N^4$, the use of two rods $N^4$, $N^5$, instead of one long rod, enabling said rod $N^5$ in its up and down motion to actuate the armed nut without binding strain on the parts. The rod $N^4$, see Figs. 1$^a$ and 1$^b$, connected with the bar $m^3$ is pivoted at $N^3$, see Fig. 1$^d$, to one end of a lever $N'$ pivoted at $N^2$, said lever having at its free end a stud or projection $h^{51}$, said stud being lowered during the time that the first step of the cam $m^{10}$ from 300 to 301 is operating in raising the bar $m^3$, it continuing its down movement while the part of the cam face 301 to 302 acts, but this descending movement of the projection $h^{51}$ is not effective for any result except when the horn is to be put, as will be described, in its abnormally low position, and said result is effected as the part 300 to 301 of the cam operates. The spring $h^{31}$ surrounding the rod $h^{27}$ rests at its upper end against the fixed ear $h^{32}$, and at its lower end against an adjustable nut $h^{33}$, see Fig. 3, the adjustment of said nut increasing the strength of said spring to secure pressure of the horn against the stock.

I will now describe the means provided for depressing or lowering the stock-support or horn into an abnormally low position at the finishing of any cycle of operation of the machine. The horn spindle has applied to its threaded end, see Fig. 1$^d$, an eared nut $h^{16}$ carrying a pin $h^{17}$ on which is pivoted one member $h^{18}$ of a toggle or supplemental lowering device, it and its coöperating member $h^{21}$ jointed together at $h^{20}$ constituting a toggle joint. Said members have like stop faces or projections $h^{19}$ which contact when the joint is broken. The stud $h^{22}$ in the lower end of the part $h^{21}$ is engaged by a link $h^{23}$ jointed at its lower end to the front end of the horn depressing lever $h^{25}$ pivoted at $H'$, the opposite or rear end of said lever being jointed to the lower end of the rod $h^{27}$ before described, which is lifted, as described, at each operation of the machine to lower the horn for feeding. The pin $h^{22}$ is embraced by one end of a bar $h^{24}$ pivotally connected at its opposite end to a pin $h^{40}$ carried by the base. The central pin $h^{20}$ of the toggle or supplemental lowering device receives a link $h^{41}$, which, in turn, is jointed to a stud $h^{42}$, carried by a lever $h^{43}$, pivoted, as represented, at its upper end on a screw stud $h^{44}$ in said base, the lower end of said lever being represented, see Figs. 1$^d$, 3 and 3$^a$, as notched to receive a steel toe $h^{45}$, said toe being clamped on said lever by a clamping screw $h^{46}$. Located below the end of said lever $h^{43}$ is a locking device $h^{47}$ for said supplemental lowering device, said locking device being represented as an arm pivoted on a stud $h^{48}$, and provided with an inserted notched steel plate $h^{49}$ confined to said arm by a screw, as $h^{50}$, see Fig. 3$^a$, said notch being adapted to at times receive the toe $h^{45}$. The locking device $h^{47}$ has extended from it, near its free end, a stud $h^{90}$ on which is hung a releasing device $h^{52}$ for said locking device $h^{47}$. The locking device $h^{47}$ is connected by a spring $h^{53\times}$ with the link $h^{41}$, and said spring acts normally to elevate said locking device that the notched plate thereof may engage said toe $h^{45}$ and lock and hold the supplemental lowering device in its normal position as when the machine is operating, see Fig. 3, said notch when in engagement with said toe keeping the lever $h^{43}$ in its vertical position with the said toggle straight and the horn elevated.

During the regular operation of the machine in driving a series of pegs or fastenings one after another, the horn depressing mechanism may act, as above described, to depress the horn to enable the stock to be fed, without, however, breaking the supplemental lowering device or toggle, such device or toggle being broken only when the machine is to be stopped and the horn put into its abnormally low position for the removal of the work, and when the horn is so depressed the lever $h^{47}$ is uncoupled from the lever $h^{43}$, the toggle then assuming the position Fig. 1$^d$.

The releasing device $h^{52}$, as herein shown, is provided at one end with a hook which is put in position to be engaged by the stud $h^{51}$ only when the said toggle joint is to be broken. Said releasing device occupies its normal position, see Fig. 3, while the machine is in operation, during which time the operator will keep his foot on the treadle H, pivoted at $H'$, the opposite end of said treadle having pivoted upon it, by a screw $H^2$, a socket $H^3$ which receives loosely the lower end of a rod $H^4$, provided with a collar $H^5$, sustaining a spring $H^6$, the upper end of which engages a guiding ear $H^7$ of the framework, said rod being extended through said ear on its way up to the starting lever $H^8$, before described, with which it is connected by a suitable pin $H^{1\times}$. When the operator puts his foot on the treadle H to depress its front end to start the machine, the upper end of said lever $H^8$ is moved away from the main shaft, letting the spring $H^{24}$ act to move the loose clutch pulley so that it engages the fast pulley $m^{12}$ and starts the shaft $A^2$ as already described. The starting lever $H^8$ when turned to start the machine puts the roller $H^{13}$ in such position that it is kept out of the range of movement of the projection $H^{26}$ of the cam block, and the roller will occupy this position so long as the operator holds the treadle H depressed, and during such time the releasing device $h^{52}$ will remain in the position Fig. 3.

The operator may release the treadle at any time, but the main shaft of the machine will be stopped only at a defined point in the cycle of operations. When the treadle is released for stopping the machine, the lever $H^8$ is moved toward the shaft $A^2$ by the spring $H^6$, and the roller $H^{13}$ meets and is arrested by some part of the said projection $H^{26}$, until in the rotation of the shaft $A^2$ the switch $H^{30}$ engages the end of the roller $H^{13}$. This roller is mounted on a headed stud screw, shown by dotted lines in Fig. 4, which extends horizontally from said lever $H^8$. A spring $H^{15}$ tends constantly to keep the roller pressed out to its farthest extent on said stud screw so that it will be in a position to be struck by said switch $H^{30}$, as described. The switch puts the lever into position to enter the depression $H^{20}$, of the cam block $H^{18}$ under the action of the spring $H^6$, thus bringing the roller $H^{12}$ into operative position to be struck by the side cam $H^{14}$ so as to effect the separation of the loose friction pulley from the fast pulley, such operation compressing the spring $H^{24}$ and freeing the constantly running loose friction clutch pulley from its coöperating friction pulley fast on the main shaft as already described. After the roller $H^{13}$ enters the depression $H^{20}$ the brake is applied to stop the machine at the desired point in the cycle of operations through the action of the cam groove $H^{43\times}$. As the rod $H^4$ descends after the roller $H^{13}$ enters the depression of the cam block $H^{18}$, it turns the treadle H, causing a third arm $H^{44}$ thereof to be moved to the right, Fig. 3, causing a link $h^{62}$, connected therewith and with said releasing device $h^{52}$ to put said device in position to be struck by the stud $h^{51}$ of the lever N', said stud acting during the first step of the upward movement of lever $m^7$ and rod $N^5$ to depress the locking lever $h^{47}$, releasing the toe of the lever $h^{43}$ permitting the horn shaft to descend by gravity, breaking the toggle joint, and allowing the stops $h^{19}$ to come together, as represented in Fig. 1$^a$, thus putting the horn in its abnormally low position for the removal of the work. During the breaking of the toggle joint a shoulder of the link $h^{41}$, shown separately in Fig. 2, engages the end of the arm $H^{44}$ of the treadle and moves it to carry the bottom of socket $H^3$ out of contact with the lower end of the rod $H^4$, which then occupies its lowest position, shown in Fig. 3$^a$.

Heretofore in similar constructions of which I am aware the rod $H^4$ has always been connected positively with and so as to move the lever H in unison with it, but herein I have broken this positive connection and have substituted for it a sliding or loose connection, such connection enabling the horn to be elevated from its abnormally low position, after the work has been applied and before the machine is started to make and drive pegs or fastenings. When the rod $H^4$ descends to put the releasing device $h^{52}$ in its operative position, as described, a collar $n^{71}$ clamped on said rod and provided with a stud $n^{61x}$ entering a hole in a bell crank lever $n^{40}$, moves said lever about its pivot $n^{51}$, causing its short arm to be moved in a direction to enable a pawl $n^{20}$, actuated by a spring $n^{30}$ to meet and engage a tooth of the series $h^{29}$ on the slide bar $h^{28}$, thus holding said bar in position so that when the toggle is broken, as described, the spring $h^{31}$ will not act to depress the bar $h^{28}$, since if the bar were so depressed the horn would not take its abnormally low position as the machine comes to rest. When the treadle H is depressed the arm $H^{44}$, engaging the shoulder of the link $h^{41}$ referred to, immediately pushes said link to straighten the toggle. The continued movement of the treadle raises the rod $H^4$ to start the machine. Furthermore, this upward movement of rod $H^4$ disengages the pawl $n^{20}$ from the ratchet teeth $h^{29}$, so that the spring $h^{31}$ acts thereafter to raise the horn to clamp the stock, the pawl remaining in its inoperative position so long as the machine continues in operation. The movement of the treadle also moves the releasing device $h^{52}$ into its inoperative position and the lever $h^{43}$ is moved into substantially vertical position, it meeting a stop $w$ which leaves the toe $h^{45}$ in position to be automatically engaged by the locking device $h^{47}$, said lever thus maintaining the center $h^{20}$ of the toggle slightly at one side of the central line of the joints $h^{17}$ and $h^{22}$, see Fig. 3, so that when the lever is released, as described, the toggle will be broken by the weight of the horn and its attached parts thus obviating the employment of any extra device to break the toggle.

Preparatory to setting forth the complete operation of the machine herein described I will repeat that Figs. 1 and 1$^d$ show the machine in its position of rest with the horn in one of its abnormally low positions, it being left in such position for the application of the stock thereto, and Fig. 8 shows the carriage in its starting position, both awl bars and awls in elevated position, the drivers in lowered position with the ends of the drivers standing in the driver passages in the throat or nose block, the peg former occupying a position to close the open sides of the two driver passages. The releasing device is engaged by the projection at the end of the lever N' and the starting and stopping lever $H^8$ occupies the position shown in Fig. 46, the clutch members being released while the brake band $H^{39}$ is firmly clamped upon its pulley $H^{40}$. The pawl $n^{20}$ is in engagement with one of the ratchet teeth of the bar $h^{28}$. The stop $o$ contacts with the tubular bearing $h^{9x}$, the peg ribbon carrier being in its lowest position with its lower side just above but practically out of contact with the upper side of the foot-plate, and the upper end of the rod $h^{12x}$ is removed from contact with the rod $h^8$ with which is connected operatively the peg ribbon carrier. The clamp $m$ is in its inoperative position with relation to the bar $h^{28}$. The clamp $n^{54}$ which grips the sleeve $n^{60}$ for locking the horn is released. The pawl $r^{15}$ is in the position, Fig. 12, where it completed its previous stroke in feeding the peg ribbon and the end of the peg ribbon stands in line with one side of the peg shortener, then occupying the position shown in Fig. 12. In this condition of the machine the operator puts his foot upon and actuates the treadle H. The first portion of the movement of this treadle is effective, as described, in removing the releasing device from the projection $h^{51}$ of the lever N', and through the arm $H^{44}$ in straightening the toggle, the final movement of the treadle causing the bottom of the socket $H^3$ to meet the rod $H^4$ and lift it, releasing pawl $n^{20}$ so that the spring $H^6$ causes the horn to clamp the stock whatever its thickness. The movement of the rod $H^4$ also effects the release of the brake members and the engagement of the clutch members, as already described, so that the machine is started into operation. Shortly after the machine starts, the cam for operating the main awl acts to depress the said awl, causing it to enter but not fully penetrate the stock clamped between the horn and the foot plate. Thereafter the portion 301—302 of the cam $m^{10}$ moves the lever $m^7$ to lift the slide $m^3$, the clamp $m$ gripping the bar $h^{28}$, whereby the horn is depressed to release the stock for feeding, and while the carriage G with the main awl is being moved to the left as described to feed the stock now released, the part 400 of the cam maintains the horn depressed. After the carriage has arrived at the end of its feeding stroke the part 401 of the cam begins to move the lever $m^7$ to depress the rod $m^6$ and its connected slide bar $m^3$ until the finger $m'$ meets the dog $m^{20}$ which, as described, disengages the clamp $m$ from the bar $h^{28}$, whereupon the spring $h^{31}$ elevates the horn to clamp the stock, the horn adapting itself to any change in the thickness of the stock. The final downward movement of the bar $m^3$ actuates the clamping block $n^{54}$ to lock the horn during the subsequent descent of the awls and drivers. The auxiliary awl bar and its awl, if two rows are to be driven, then descend, and the awl meets and is thrust into the stock on the horn, and at the same time the main awl bar and its awl are again moved downward, both awls penetrating the stock at substantially the same time. Both awls having been forced through the stock the devices hereinbefore described for operating the awl bars act to lift the said awls simultaneously. The awls are drawn upwardly from the clamped stock, the arm $r^{31}$ is moved carrying the pin $r^{32}$ to the right in the slot $r^{33}$, drawing the rod $h$ in the direction of the arrow near it in Fig. 19, such movement of said rod causing the pawl $r^{15}$ engaging the ratchet wheel of the peg ribbon feeding mechanism to be moved and feed the peg ribbon for a distance sufficient to put the end of the peg ribbon in the auxiliary driver passage $s^3$ in the throat if two pegs are to be formed, or half the distance for only one peg. The awls having been fully raised and the peg ribbon having been fed into its required position according as two pegs or one peg may be desired, the peg shortener operates.

As has been described, the peg ribbon carrier during the normal operation of the machine varies in position according to the thickness of the stock. Hence, at the time the peg shortener operates, the edge of the peg ribbon, from which is to be removed the surplus wood not needed in the formation of the peg or pegs which are to unite the stock of the particular thickness then being calipered between the horn and the foot plate, is in the line of movement of the peg shortener.

The peg shortener is moved from its position, Fig. 19, into its position, Fig. 12, and the edge of said shortener acts against one side of the peg ribbon, the cutter plate $u'$ and the shear block $p^{14}$ supporting the opposite side of said ribbon so that said shortener makes a short cut longitudinally in the peg ribbon and a vertical cut from said longitudinal cut to one edge of the ribbon, thereby removing the surplus from the ribbon and leaving a straight smooth top for the peg or pegs about to be formed and a straight vertical edge which may form part of a subsequent peg. The peg shortener completes its stroke, as represented in Fig. 12, ejecting the surplus wood through the open space above throat S, bringing the grooves $o^5$ and $o^7$ in line with the drivers. The carriage G is then returned to its starting position, and the peg former $t$ is moved, see Fig. 28, to act against the shortened part of the peg ribbon, and if the feed stroke of the peg ribbon has put the end thereof fully in the auxiliary driver passage $s^3$, will cut said peg ribbon in two parallel lines leaving a peg in said auxiliary peg driver passage, another part of the peg ribbon operated upon directly by the peg former being moved into the main driver passage as shown in Fig. 29. The return of the carriage G into its starting position puts the driver passages and the pegs therein directly over the holes previously made in the stock by the awls, and while the stock is yet clamped the drivers drive the pegs into the stock, the peg former at such time closing the open side of each driver passage so as to guide both the pegs and the drivers. This cycle of operations will be repeated so long as the treadle H is maintained depressed. If, however, it is desired to drive but one peg at each operation of the machine, then the operator will turn the knee lever from the position shown in Fig. 32 until the stop $e^{36}$ meets the main column. This will withdraw the stud $e^{10}$ from the range of movement of the cam lump E, thus rendering the auxiliary awl inoperative and at the same time it will put the end of the feed regulating lever $e^{26}$ in position to limit the back stroke of the peg ribbon feeding mechanism so that the ribbon will be fed only a distance equal to the width of one peg and the peg former will sever from the ribbon one peg only, carrying it into the main driver passage, as already described.

The operation of the parts of the machine whereby the clutch is released, the brake applied, and the horn given its abnormally low position as the machine comes to rest has been fully set forth already in the foregoing description.

Having described my invention, what I claim as new and desire to secure by Letters Patent is:—

1. In a machine of the class described, a plurality of awls movable successively into stock during a single cycle of operations of the machine to form awl holes in a plurality of rows extending along the line of feed of the stock, and actuating devices therefor.

2. In a machine of the class described, a plurality of awls movable separately into stock to form a plurality of awl holes along the line of feed of the stock, one awl being movable also to feed the stock, and actuating devices therefor.

3. In a machine of the class described, a plurality of awls, actuating mechanism therefor constructed and arranged to cause the awls to enter the stock successively to form therein openings for fastenings, and additional co-acting mechanism for feeding the stock laterally while one awl only is in the stock.

4. In a machine of the class described, the combination with a plurality of stock-penetrating awls, of mechanism for operating all of them to prick a plurality of awl holes, and means for causing one of them to feed the stock when the other or others are out of the stock.

5. In a machine of the class described, a main awl, means to actuate said awl to enter the stock, means to move said awl to feed the stock, an auxiliary awl, and means to actuate said auxiliary awl to enter the stock.

6. In a machine of the class described, two awls, actuating devices therefor constructed and arranged first to cause one of said awls to enter the stock in advance of the other, then to effect a feeding movement of the stock while one awl is inserted therein and while the other awl is out of the stock, and finally to cause both awls to penetrate the stock at the end of the feeding operation.

7. In a machine of the class described, a main awl bar having an awl, means to actuate said awl bar to cause its awl to enter the stock, means to move said awl bar to feed the stock, an auxiliary awl bar and awl, and means to actuate said auxiliary awl bar that its awl may enter the stock at the end of the feeding stroke of the main awl.

8. In a machine of the class described, two awls, means for moving one of said awls laterally to feed the stock, actuating mechanism for producing first a partial longitudinal movement of one of the awls whereby it enters the stock but does not project therethrough during the lateral feed movement of the awl and then is caused to pass wholly through the stock when said lateral feed movement is not taking place, and means for actuating said other awl to penetrate the stock when said lateral feed movement is not taking place.

9. In a machine of the class described, two awls, means to actuate one of them for feeding the stock, means to suspend the operation of the other awl during the stock feeding, and means to actuate both awls to penetrate the stock at the end of the feeding operation.

10. In a machine of the class described, an awl, mechanism for moving it in one direction, separate mechanism for moving it in the opposite direction, and means for throwing the first mechanism out of operation.

11. In a machine of the class described, an awl constructed and arranged to form an opening in stock, and separate mechanisms for moving the awl positively in opposite directions.

12. In a machine of the class described, a plurality of awl bars, each provided with an awl, independent actuating mechanisms therefor, and means for suspending the operation of one of said awl bars while the machine continues in operation.

13. In a machine of the class described, means for forming fastenings and inserting them into stock either in one or in two rows as desired, devices for forming openings in stock to receive the fastenings, and means whereby while the machine is continuously in operation forming openings for and inserting fastenings in one row it may be made to form openings for and insert fastenings in an additional row and vice versa.

14. In a machine of the class described, an awl, mechanism for actuating it to cause it to form an opening in the stock, and means for rendering said mechanism inoperative including a member mounted on a fixed part of the machine and under the control of the operator, whereby the operation of the awl may be suspended while the machine is continuously in operation.

15. In a machine of the class described, an awl, mechanism for actuating it to form an opening in the stock, and means for suspending and for starting the operation of the awl while the machine is continuously in operation.

16. In a machine of the class described, a plurality of awls, actuating mechanism therefor, and means for suspending and for subsequently starting again the operation of one of said awls, without affecting the operation of the other, while the machine is continuously in operation.

17. In a machine of the class described, a plurality of awls separately mounted, mechanism for actuating them to form openings in stock, and devices under the control of the operator while the machine is continuously in operation for suspending the operation of one awl without affecting the other.

18. In a machine of the class described, a shaft, a cam on said shaft, a movable carriage, an awl bar having an awl and being reciprocable in said carriage, connection between said cam and said awl bar comprising a member movable into and out of operative engagement with said cam, and means controlled by the operator for moving said member whereby the awl may be rendered operative or inoperative as desired.

19. In a machine of the class described, two awl bars each provided with an awl, independent actuating mechanisms for said awls, means to move one of said awls to feed the stock, a stock-support, and means to depress it to release the stock preparatory to the feeding of the stock.

20. In a machine of the class described, an awl and means for actuating it, means for feeding fastening material, means to suspend the operation of the awl and simultaneously to vary the feed of the material by the feeding means.

21. In a machine of the class described, two awl bars, each provided with an awl, independent actuating means for said awl bars, a peg ribbon carrier, peg ribbon feeding mechanism, means to suspend the operation of one of said awls, and means to lessen at the same time the extent of feeding movement of the peg ribbon.

22. In a machine of the class described, a peg ribbon carrier, peg forming means, peg ribbon feeding means, a feed regulating rod, and means to control the extent of movement of said rod to thereby enable the peg ribbon to be moved for a distance to insure the formation of one peg or a plurality of pegs, as desired.

23. In a machine of the class described, a peg ribbon carrier, means for feeding a peg ribbon sustained by said carrier a sufficient distance to provide for a plurality of pegs, and means, which may be actuated while the machine continues in operation, for shortening said feeding movement to provide for but one peg.

24. In a machine of the class described, a peg ribbon carrier, means for forming a peg shorter than the width of the peg ribbon, means for feeding a peg ribbon a sufficient distance to provide for a plurality of pegs, and means for shortening said feeding movement to provide for but one peg.

25. In a machine of the class described, a peg ribbon carrier, mechanism for feeding a peg ribbon in said carrier, a plurality of awls, means to suspend the operation of one of said awls and means to vary at the same time the extent of feeding movement of the peg ribbon.

26. In a machine of the class described, a carriage having a vertical passage, a plurality of awl bars each provided with an awl, a driver bar provided with a driver, all said bars being arranged in said passage in contact one with another and so as to be guided by the walls of said passage and separate means to actuate each of said bars.

27. In a machine of the class described, a carriage having a vertical passage, a shouldered driver bar, and a plurality of awl bars of different widths each having an awl, all of said bars being fitted to slide vertically in said passage, the wider of said awl bars overlapping the shoulder of the driver bar.

28. In a machine of the class described, a movable carriage having a guideway, combined with a vertically movable peg ribbon carrier having a hollow shank placed in said guideway.

29. In a machine of the class described, a peg ribbon carrier, and means to form a plurality of pegs simultaneously from a single peg ribbon sustained by said carrier.

30. In a machine of the class described, peg forming mechanism, means to actuate it to form a plurality of pegs from a peg ribbon at one stroke, and means to drive said pegs.

31. In a machine of the class described, means to remove from a peg ribbon at one stroke the surplus material not needed for a plurality of pegs, and a device to form a plurality of pegs from said peg ribbon at one stroke.

32. In a machine of the class described, a peg ribbon carrier or support, means for forming from peg ribbon at one operation of the machine a plurality of pegs, means to vary automatically the length of the pegs to adapt them to the thickness of the stock, a plurality of awls, and means to acutate one of them for feeding the stock.

33. In a machine of the class described, a throat having a plurality of driver passages, a plurality of drivers, a support for a piece of material from which fastenings are to be made, and a punching device constructed and operated both to form simultaneously from said material a plurality of fastenings by acting upon it at a distance from its end and also to put or leave said fastenings respectively in driving position in said passages.

34. In a pegging machine, a peg ribbon support, means to form from a peg ribbon in said support a plurality of pegs at each operation of the machine, and means to drive said plurality of pegs.

35. In a pegging machine, means for forming from a peg ribbon a plurality of pegs at each operation of the machine, means for driving a plurality of pegs substantially simultaneously, and means for varying the length of the plurality of pegs prior to each operation of the peg driving means.

36. In a pegging machine, means for forming from peg ribbon a plurality of pegs at each operation of the machine, means for driving a plurality of pegs substantially simultaneously, a peg ribbon support, and means to change its position automatically according to variations in the thickness of the stock to be pegged.

37. In a pegging machine, means to caliper the stock to be pegged, a peg ribbon support operatively connected with said calipering means and occupying a variable position in accordance with the thickness of the stock, means for driving a plurality of pegs at one operation, and means for forming from peg ribbon in said support a plurality of pegs of the same length, said plurality of pegs successively formed varying in length to accord with the thickness of the stock being pegged.

38. In a pegging machine, a stock support or horn variable as to its position according to variations in thickness of stock, a peg ribbon support, and means to sever a plurality of pegs from peg ribbon and drive the same at one operation of the machine, said pegs being adapted in length to the thickness of stock on the stock support or horn.

39. In a pegging machine, a peg ribbon support, a stock support, connections between said peg ribbon support and said stock support for raising and lowering the peg ribbon support according to the variations in the thickness of stock, means to form from one peg ribbon a plurality of pegs at one operation of the machine, and means to drive simultaneously a plurality of pegs.

40. In a pegging machine, coöperating means both to form from peg ribbon and drive a plurality of pegs, each peg being both formed and driven at a single operation of the machine, combined with means for automatically varying the length of the pegs at each operation as the thickness of the stock being pegged varies.

41. In a machine of the class described, a peg ribbon carrier, peg ribbon feeding means to feed a peg ribbon in said carrier, a plurality of driver passages, a peg former and means for actuating it to form two pegs from the peg ribbon and leave them in said driver passages.

42. In a machine of the class described, a throat having a plurality of driver passages, a peg ribbon carrier, means to move a peg ribbon therein to put its end in one of the driver passages, combined with a peg former, and means to actuate said former to cut a peg from said ribbon at a point removed from its end and put such peg in the other driver passage.

43. In a machine of the class described, a throat having awl and driver passages, a peg ribbon carrier vertically movable with relation to said throat, peg ribbon feeding means to feed a peg ribbon into said throat, peg shortening mechanism, means to control the position of said peg ribbon carrier with relation to the peg shortening means, and means to actuate said shortening mechanism to remove from the peg ribbon any surplus wood not required in the peg next to be formed.

44. In a machine of the class described, a plurality of drivers, means to actuate them, a throat having a plurality of driver passages open at right angles to each other, and a peg former to form a plurality of pegs from one peg ribbon and then close the open sides of both of said driver passages while the pegs are being driven.

45. In a machine of the class described, a movable carriage having a throat provided with a driver passage, a peg former movable in said throat, a lever mounted upon and movable with said carriage, connections between said lever and said peg former, said lever having an attached link the opposite end of which is fixed with relation to the main framework, whereby said lever, as the carriage is moved, moves said former in the same direction as the carriage but with a longer stroke, to thereby enable the former to form a peg and put it into the driver passage.

46. In a pegging machine, means to caliper stock being pegged, means for forming a plurality of pegs at each operation of the machine and a single mechanism controlled by the calipering means for determining automatically the length of each of the plurality of pegs according to the thickness of the stock.

47. In a machine of the class described, a throat having a slot to receive the end of a peg ribbon, one end of said slot constituting an auxiliary driver passage, said throat having a main driver passage in communication with said slot by a passage at right angles to said slot, a peg former movable in said last named passage, means to support one side of the peg ribbon while being acted upon by said former, and means to move said former that it may act against one side of said peg ribbon, detach a peg therefrom and put it into the main driver passage, leaving in the auxiliary driver passage a peg formed from the end of the peg ribbon.

48. In a machine of the class described, a throat having a driver passage and a guideway for a peg former, a peg former placed in said guideway and having an opening in its shank, a connection having a ball-like end entering said opening in the shank of the peg former, a lever to which said connection is attached, and means to operate said lever to reciprocate said former that it may form pegs from a peg ribbon.

49. In a machine of the class described, a throat having a plurality of driver passages, and a peg ribbon carrier combined with a peg shortener having openings for the passage of the drivers when driving pegs from said passages into the stock.

50. In a machine of the class described, a peg shortener having a driver passage, a slide bar carrying the same, a movable lever, a connection between said slide bar and lever and an eccentric, the adjustment of which enables the driver passage in said shortener to be positioned with relation to the path of the driver.

51. In a machine of the class described, a peg ribbon carrier, a peg former and a peg shortener, means to actuate them to produce a shortened peg, a driver passage in said peg shortener and means to place said driver passage in position under the driver.

52. In a machine of the class described, a peg ribbon carrier controlled as to its position vertically by variations in thickness of stock on the stock-support, a peg ribbon feeding device coöperating with a peg ribbon in said carrier, a rod for imparting motion to said peg ribbon feeding device, a lever actuating said rod and presenting a stud upon which said rod is movable vertically to correspond with the changed positions of the peg ribbon carrier due to variations in thickness of the stock.

53. In a machine of the class described, a stock support, a foot-plate, a peg ribbon carrier located above said foot-plate, an arm coöperating with said peg ribbon carrier and deriving vertical movement from the stock-support for a variable distance according to thickness of stock being calipered between the stock-support and the foot-plate, peg ribbon feeding mechanism, an actuating link or rod therefor, and means to maintain the same substantially horizontal during its change of position with the peg ribbon carrier.

54. In a machine of the class described, an awl, means to move it, a peg ribbon carrier, a peg shortening knife or cutter movable transversely with relation to said carrier, one of said parts being bodily movable with relation to the other, a throat with which said carrier coöperates, and a horn or stock support movable toward and from said throat and connected to said bodily movable part and provided with a hole or passage through its upper end or tip for said awl.

55. In a machine of the class described, a driver, an automatically variable stock support to sustain the stock against the thrust of the driver, peg ribbon sustaining means movable in unison with the stock support, a peg former, a peg shortener independently supported, and devices relatively to actuate said peg former, said peg ribbon sustaining means and said peg shortener, whereby a peg of a length corresponding to the thickness of the stock on the stock support is formed from the peg ribbon, the surplus wood of the ribbon not required for a shortened peg is removed and the ribbon is left with a vertical edge.

56. In a machine of the class described, a peg ribbon carrier, mechanism to remove from the end of a peg ribbon the surplus wood not required in the peg next to be formed, means to vary the relative positions of said carrier and said mechanism according to the thickness of the stock being pegged, whereby a peg of the proper length is left projecting from the end of the ribbon, and an independently operated device for subsequently detaching said peg.

57. In a machine of the class described, a throat provided with a driver passage, means for supporting a peg ribbon with its end in the driver passage, means for severing the end of the ribbon in said passage to form a peg, and co-acting means for automatically varying the length of the peg formed according to the thickness of the stock.

58. In a machine of the class described, means to caliper stock varying in thickness, a driver, means to put the end of a peg ribbon in the path of movement of the driver, devices for forming from the end of said ribbon a peg of a length determined by the calipering means.

59. In a machine of the class described, a throat provided with a longitudinal passage for the reception of a driver, and having a laterally extended opening communicating with said longitudinal passage, a peg ribbon carrier coöperating with said lateral passage, a peg shortening knife or cutter movable across the line of feed of the ribbon, one of said parts being bodily movable with relation to the other, a vertically movable horn or stock support connected to said bodily movable part, means for feeding the ribbon through its carrier into the longitudinal passage in said throat, means for slicing the peg from the ribbon, and a driver to drive the peg out of the said longitudinal passage.

60. In a machine of the class described, a throat, a driver, means to reciprocate said driver, a vertically movable peg ribbon carrier coöperating with said throat, means to feed a peg ribbon into said throat, a cutter to remove a portion of the ribbon and reduce the width thereof for a portion of its length, and a second cutter to act on said ribbon for substantially its entire width if required.

61. In a machine of the class described, a throat, a driver, means to reciprocate said driver, a vertically movable peg ribbon carrier coöperating with said throat, means to feed a peg ribbon into said throat, a peg shortener, and a knife to sever the portion of the ribbon in the throat from the ribbon in the carrier.

62. In a machine of the class described, a driver, a throat provided with a passage in which said driver is reciprocated, a peg ribbon carrier movable bodily in a substantially vertical plane, a peg ribbon feed mechanism to feed the end of a peg ribbon into the passage in the throat, a knife or cutter to act on the portion of the ribbon in the driver passage and render said portion of less width than the remaining portion of the said ribbon, means to sever the portion of the ribbon in the driver passage from the remaining portion of the ribbon, and a vertically movable horn or stock support connected to said carrier to determine automatically the amount of the ribbon to be removed from the end within the driver passage.

63. In a machine of the class described, a throat provided with a driver passage, a peg ribbon carrier, means for folding the end of a peg ribbon sustained by the carrier into said passage, means for detaching the end of said peg ribbon to form a peg of the required length, and means for varying the relative positions of said carrier and said detaching means.

64. In a machine of the class described, a throat provided with a driver passage and with a slot communicating with said passage, a peg ribbon carrier extending into said slot and movable bodily therein according to the thickness of the stock being pegged, and a peg shortener to act upon the peg ribbon sustained by the carrier.

65. In a machine adapted to make pegs of varying length from a peg ribbon, a horn or stock support, means to vary the position of the peg ribbon according to the position of the horn or stock support, means to form from the peg ribbon a peg of the length required for the stock, said means including a surplus remover to remove the wood not needed for the peg after it has been placed in the driver passage.

66. In a machine of the class described, a throat provided with two slots crossing each other substantially at right angles, means for feeding a peg ribbon into one of said slots, and a peg former operating in the other slot for detaching a peg from said ribbon, the end face of the former co-acting with the walls of one of the slots to produce a driver passage from which the formed peg may be driven into the stock.

67. In a machine of the class described, a throat provided with two driver passages each opening at one side, and a device movable to close simultaneously the open sides of both of the passages.

68. In a machine of the class described, a foot plate, a horn or stock support, means to remove a peg from a peg ribbon, a peg ribbon carrier, peg shortening means, one of said two last named parts being movable with relation to the other, and mechanism for moving said movable part according to variations in the thickness of the stock, said movement being positive in one direction and yielding in the opposite direction.

69. In a machine of the class described, means to remove a peg from a peg ribbon, a peg ribbon carrier, peg shortening means, one of said two last named parts being movable with relation to the other, a horn or stock support, and connections, including a yielding medium, between said horn or stock support and said movable part, whereby said part is moved positively in one direction and yieldingly in the oppisite direction.

70. In a machine of the class described, a cam having an actuating surface presenting two grades or steps, a lever actuated by said cam, said lever having attached to it a slide bar provided with a finger having a clamp, a dog sustaining said clamp, a hard depressing lever, a bar connected with said lever and located between said slide bar and said clamp, the first step or grade of said cam lifting the slide bar without lifting the bar connected with the horn depressing lever, the second step of said cam causing the clamp to engage the bar connected with the depressing lever to lower the horn.

71. In a machine of the class described, a horn depressing lever, a longitudinally grooved bar connected therewith, a slide bar deriving a uniform up and down stroke from a running part of the machine during the operation of inserting fastenings, a finger mounted on the slide bar and provided with a clamp grooved vertically to correspond with the grooves in the face of the grooved bar, and means acting in the latter part of the upward movement of said slide-bar to cause the clamp to engage the grooved bar to depress the horn.

72. In a machine of the class described, a horn depressing lever, a slide bar connected therewith and provided with a series of longitudinal grooves and with a transverse series of ratchet teeth, a clamp presenting at its face vertical grooves to engage at times the longitudinal grooves of said bar to lift it and depress the horn, and a pawl to engage the ratchet teeth of said bar and prevent it from being lowered when the machine is stopped.

73. In a machine of the class described, a horn depressing lever, a slide bar connected therewith and provided with a series of ratchet teeth, a pawl, a spring acting normally to put said pawl in engagement with said ratchet teeth, a rod connected with the starting treadle, and a device actuated by said rod to put said pawl in its inoperative position, keeping it there while the operator retains his foot on the starting treadle.

74. In a machine of the class described, a horn depressing lever, a rod connected therewith, a sleeve mounted on said rod, a clamp to embrace said sleeve, a stud extended through part of said clamp, an armed nut applied to said stud, and a connected rod deriving uniform motion from the operative parts of the machine during the operation thereof, whereby said nut is moved at a predetermined time in the cycle of operations of the machine to lock said horn and maintain the horn in elevated position.

75. In a machine of the class described, a bar, means to reciprocate said bar for the same distance at each stroke, a finger pivoted on said bar, a dog on which the free end of said finger rests during part of the stroke of said bar, an eccentric stud carried by said finger, a clamp mounted on said stud, a spring acting on said finger to keep it normally in contact with said dog, a stock support, and a bar operatively connected therewith and interposed between the first named bar and said clamp to operate substantially as described.

76. In a machine of the class described, a throat, a vertically movable peg ribbon carrier coöperating therewith and having a guideway for a peg ribbon, a ribbon feeding wheel mounted directly on the carrier, a stock support vertically adjustable according to variations in the thickness of the stock, and connections between the stock support and the peg ribbon carrier.

77. In a machine of the class described, a plurality of drivers, a support for a piece of material from which fastenings are to be made and means constructed and arranged both to form simultaneously from said material a plurality of fastenings by acting upon it at a distance from its end and also at the same time to put or leave said fastenings respectively in position for driving.

78. In a machine of the class described, a throat having a plurality of driver passages, a plurality of drivers, a guideway and support for a line of fastening material, a punching device operating substantially at right angles to said line at a distance from its end and constructed and arranged both to separate simultaneously from said line a plurality of fastenings and also at the same time to put or leave said fastenings as formed respectively in driving position in said passages and in alinement with the respective drivers.

79. In a machine of the class described, a plurality of awls, means to cause said awls to enter the work separately, and each form an opening therein to receive a fastening and means to cause one of said awls to feed the work.

80. In a machine of the class described, two awls, means to cause one of said awls to enter the work in advance of the other, and to cause the other awl to enter the work after the same has been fed, and means to cause said first named awl to feed the work.

81. In a machine of the class described, two awls, means to insert them successively in the work, and means operating between the successive entries of the awls into the work to effect a feed of the work.

82. In a machine of the class described, two awls, means to effect their insertion into the work at different times, and means to cause a feed of the work by or through the awl first inserted therein.

83. In a machine of the class described, the combination with a plurality of stock-penetrating awls, of mechanism for operating all of them to prick a plurality of awl holes and means for causing one of them to feed the stock.

84. In a machine of the class described, two awls, means to cause one of said awls to enter the work in advance of the other, to suspend the operation of the other awl during the stock feeding and to thereafter actuate both of the awls to penetrate the stock at the end of the feeding operation, and means to cause the awl first entering the stock to feed the same.

In testimony whereof, I have signed my name to this specification, in the presence of two subscribing witnesses.

ORRELL ASHTON.

Witnesses:
GEO. W. GREGORY,
NELSON W. HOWARD.